United States Patent
Dong et al.

(10) Patent No.: US 10,645,004 B2
(45) Date of Patent: May 5, 2020

(54) METHODS TO SUPPORT MESSAGE ROUTING AT SERVICE LAYER

(71) Applicant: Convida Wireless, LLC, Wilmington, DE (US)

(72) Inventors: Lijun Dong, San Diego, CA (US); Guang Lu, Thornhill (CA); Chonggang Wang, Princeton, NJ (US); Hongkun Li, Malvern, PA (US); Qing Li, Princeton Junction, NJ (US); Rocco Di Girolamo, Lavel (CA); Catalina M. Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 127 days.

(21) Appl. No.: 15/558,648

(22) PCT Filed: Mar. 18, 2016

(86) PCT No.: PCT/US2016/023136
§ 371 (c)(1),
(2) Date: Sep. 15, 2017

(87) PCT Pub. No.: WO2016/153997
PCT Pub. Date: Sep. 29, 2016

(65) Prior Publication Data
US 2018/0109453 A1    Apr. 19, 2018

Related U.S. Application Data

(60) Provisional application No. 62/136,002, filed on Mar. 20, 2015.

(51) Int. Cl.
*G06F 3/00*        (2006.01)
*H04L 12/741*   (2013.01)
(Continued)

(52) U.S. Cl.
CPC .............. *H04L 45/745* (2013.01); *G06F 9/54* (2013.01); *H04L 45/124* (2013.01);
(Continued)

(58) Field of Classification Search
CPC ........................................................ G06F 9/54
(Continued)

(56) References Cited

U.S. PATENT DOCUMENTS

| 5,754,790 A | * | 5/1998 | France | H04L 45/02 709/238 |
| 7,174,387 B1 | * | 2/2007 | Shand | H04L 45/02 709/237 |

(Continued)

FOREIGN PATENT DOCUMENTS

WO    2009/020980 A1    2/2009

OTHER PUBLICATIONS

Jianli Pan, Enhanced MILSA Architecture for Naming, Addressing, Routing and Security Issues in the Next Generation Internet . (Year: 2009).*

(Continued)

*Primary Examiner* — Lechi Truong
(74) *Attorney, Agent, or Firm* — BakerHostetler

(57) ABSTRACT

A Service Layer Message Routing Service at the Service Layer entity is capable of routing service layer messages to reach the target with optimal performance, e.g. shortest service layer distance, shortest network layer distance, least end-to-end delay, highest reliability, etc. The service layer Message Routing Service may have the following example functions: Maintain Service Layer Neighbor can take charge of finding and updating the service layer Neighbors of the service layer entity due to registration or policy configuration; Build Service Layer Routing Table can take charge of building the Service Layer routing table, which routes a service layer message from a service layer entity to the other service layer entities with the optimal performance that is desired by the message originator; and Route Service Layer Message can take charge of routing/forwarding a service layer message by the service layer entity towards other service layer entities.

18 Claims, 27 Drawing Sheets

(51) Int. Cl.
*H04L 12/721* (2013.01)
*H04L 12/725* (2013.01)
*H04L 12/717* (2013.01)
*G06F 9/54* (2006.01)
*H04L 29/08* (2006.01)
*H04W 4/70* (2018.01)

(52) U.S. Cl.
CPC ............ *H04L 45/306* (2013.01); *H04L 45/42* (2013.01); *H04L 69/325* (2013.01); *H04W 4/70* (2018.02)

(58) Field of Classification Search
USPC .......................................................... 719/310
See application file for complete search history.

(56) References Cited

U.S. PATENT DOCUMENTS

| | | | | |
|---|---|---|---|---|
| 2002/0078202 A1* | 6/2002 | Ando | ................. | H04L 63/0236 709/225 |
| 2003/0031123 A1* | 2/2003 | Gilmour | ............. | G06F 15/8023 370/216 |
| 2009/0041033 A1* | 2/2009 | Marucheck | ............. | H04L 12/42 370/400 |
| 2010/0284287 A1* | 11/2010 | Venuto | ................. | H04W 40/08 370/252 |
| 2011/0205949 A1* | 8/2011 | Maenpaa | ............ | H04W 40/005 370/311 |
| 2013/0315257 A1* | 11/2013 | Welin | ...................... | H04L 45/12 370/401 |
| 2014/0120865 A1* | 5/2014 | May | ...................... | H04L 45/306 455/406 |
| 2017/0118117 A1* | 4/2017 | Kamel | ................. | H04L 45/306 |

OTHER PUBLICATIONS

OneM2M-TS0007-2.0.0-V10-0_TechnicalStandard_ServiceComponents_Sep. 2017_229pages.
OneM2M-TS-001-V1-6-1_TechnicalSpecitication_FunctionalArchitecture_Jan. 30, 2015_321pages.

* cited by examiner

METHODS TO SUPPORT MESSAGE ROUTING AT SERVICE LAYER

CROSS-REFERENCE TO RELATED APPLICATIONS

This Application is a National Stage Application filed under 35 U.S.C. § 371 of International Application No. PCT/US2016/023136 filed Mar. 18, 2016, which claims the benefit of U.S. Provisional Patent Application Ser. No. 62/136,002, filed Mar. 30, 2015, the disclosure of which is hereby incorporated by reference as if set forth in its entirety.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold. As will be appreciated, the IoT has the potential to include many millions of devices.

oneM2M includes technical specifications which address the need for a common M2M Service Layer that can be readily embedded within various hardware and software, and relied upon to connect the myriad of devices in the field with M2M application servers worldwide.

FIG. 1 shows an oneM2M architecture. "oneM2M-TS-0001 oneM2M Functional Architecture-V-1.6.1" hereafter "oneM2M functional architecture" defines a Service Layer called a Common Service Entity (CSE) 102. The purpose of the Service Layer is to provide "horizontal" services that can be utilized by different "vertical" M2M systems and applications, such as e-Health, fleet management, and smart homes.

The CSE 102 supports four reference points. The Mca reference point interfaces with the Application Entity (AE) 106. The Mcc reference point interfaces with another CSE 110 within the same service provider domain and the Mcc' reference point interfaces with another CSE in a different service provider domain 104. The Mcn reference point interfaces with the underlying network service entity (NSE) 108. An NSE provides underlying network services to the CSEs, such as device management, location services and device triggering. CSE 102 contains multiple logical functions called "Common Service Functions (CSFs)", such as "Discovery", "Data Management & Repository". FIG. 2 illustrates the CSFs under development at oneM2M.

The oneM2M architecture enables the following types of Nodes:

Application Service Node (ASN) is a Node that contains one CSE and contains at least one Application Entity (AE). Example of physical mapping: an ASN could reside in an M2M Device.

Application Dedicated Node (ADN) is a Node that contains at least one AE and does not contain a CSE. There may be zero or more ADNs in the Field Domain of the oneM2M System. Example of physical mapping: an Application Dedicated Node could reside in a constrained M2M Device.

Middle Node (MN) is a Node that contains one CSE and contains zero or more AEs. There may be zero or more MNs in the Field Domain of the oneM2M System. Example of physical mapping: a MN could reside in an M2M Gateway.

Infrastructure Node (IN) is a Node that contains one CSE and contains zero or more AEs. There is exactly one IN in the Infrastructure Domain per oneM2M Service Provider. A CSE in an IN may contain CSE functions not applicable to other node types. Example of physical mapping: an IN could reside in an M2M Service Infrastructure.

Non-oneM2M Node (NoDN) is a Node that does not contain oneM2M Entities (neither AEs nor CSEs). Such Nodes represent devices attached to the oneM2M system for interworking purposes, including management.

The possible configurations of inter-connecting the various entities supported within the oneM2M system are illustrated in FIG. 3.

Registration

An AE on an ASN, an MN or an IN performs registration locally with the corresponding CSE in order to use M2M services offered by that CSE. An AE on an ADN performs registration with the CSE on an MN or an IN in order to use M2M services offered by that CSE. An IN-AE performs registration with the corresponding CSE on an IN in order to use M2M services offered by that IN CSE.

The CSE on an ASN performs registration with the CSE in the MN in order to be able to use M2M Services offered by the CSE in the MN. As a result of successful ASN-CSE registration with the MN-CSE, the CSEs on the ASN and the MN establish a relationship allowing them to exchange information.

The CSE on an MN performs registration with the CSE of another MN in order to be able to use M2M Services offered by the CSE in the other MN. As a result of successful MN-CSE registration with the other MN-CSE, the CSEs on the MNs establish a relationship allowing them to exchange information.

The CSE on an ASN or on an MN perform registration with the CSE in the IN in order to be able to use M2M Services offered by the CSE in the IN. As a result of successful ASN/MN registration with the IN-CSE, the CSEs on ASN/MN and IN establish a relationship allowing them to exchange information.

Following a successful registration of an AE to a CSE, the AE is able to access, assuming access privilege is granted, the resources in all the CSEs that are potential targets of request from the Registrar CSE.

The followings are some registration regulations specified in the oneM2M Functional Architecture:

An AE shall not be registered to more than one CSE (ASN-CSE, MN-CSE or IN-CSE).

An ASN-CSE shall be able to be registered to at most one other CSE (MN-CSE or IN-CSE).

An MN-CSE shall be able to be registered to at most one other CSE (MN-CSE or IN-CSE).

An MN-CSE shall be able to support only a single registration towards another MN-CSE or an IN-CSE.

A concatenation (registration chain) of multiple uni-directional registrations shall not form a loop. E.g. two MN-CSEs A and B, cannot register with each other. Three MN-CSEs A, B and C, where A registers to B, and B registers to C, then C cannot register to A.

Procedure of Accessing Resources (Multiple Hops)

FIG. 4 shows the existing procedure of an originator accessing a resource at the Hosting CSE, which is multiple hops away.

The Originator of the Request accesses a resource. The Originator of the Request may be an AE or a CSE. Registrar CSE, Transit CSE(s) and the Hosting CSE are different entities.

Registrar CSE:
Forwards the Request to a Transit-1 CSE (e.g. MN-CSE) that the Registrar CSE is registered with, if configured through policies to do so; or
Forwards the request to an IN-CSE if the Registrar CSE is registered with IN-CSE and if configured through policies to do so.

Transit-N CSE:
Forwards the request to the Hosting CSE if it is registered with the Hosting CSE; or
Forwards the Request to another Transit-(N+1) CSE (e.g. another MN-CSE) that the Transit-N CSE is registered with; or
Forwards the request to an IN-CSE if the Transit-N CSE is registered with the IN-CSE.

In case the Request reaches the IN-CSE, the IN-CSE:
Performs the processing defined under 'Hosting CSE' below if the targeted resource is hosted on IN-CSE;
Forwards the request to another IN-CSE if the resource belongs to another M2M SP; or
Forwards the request to the Hosting CSE if the latter is known (e.g. announcements) by the IN-CSE.

Hosting CSE checks the Access Control Privileges for accessing the resource and depending on the expected result content respond with a success or failure Response.

M2M Requests Routing Policies

CSEs 102 can use policies to govern routing of M2M requests to the next hop towards its target. Routing, through these policies, can be based, for example, on the target CSE, target M2M domain, specific types of resources if applicable, priority of a request, etc.

These policies are not defined in the oneM2M Functional Architecture. It is the responsibility of M2M SP and the CSE administrator to ensure the appropriateness of these policies for routing purposes.

oneM2M Service Architecture

The M2M Service Architecture described in the oneM2M Functional Architecture augments the oneM2M Functional Architecture by specifying M2M Services provided to M2M Application and M2M Service Providers.

The following components are defined as shown in FIG. 5. Service Exposure Component 504 exposes services to AEs 106. Network Service Utilization Component 506 consumes services from the NSE 108. Remote Service Exposure Component 502 connects Services from different M2M environments.

Internet Routing Protocols

Routing Information Protocol (RIP) was one of the earliest intra-AS Internet routing protocols (Interior Gateway Protocol, IGP) and is still in widespread use today (another example of IGP is Open Shortest Path First, OSPF). The version of RIP specified in RFC 1048 uses hop count as a cost metric, that is, each link has a cost of 1. RIP uses the term hop, which is the number of subnets traversed along the shortest path from source router to destination subnet, including the destination subnet. FIG. 6 shows a portion of an autonomous system.

The maximum cost of a path is limited to 15, thus limiting the use of RIP to autonomous systems that are fewer than 15 hops in diameter. In RIP, routing updates are exchanged between neighbors approximately every 30 seconds using a RIP advertisement.

Each router maintains a RIP table known as a routing table. A router's routing table includes both the router's distance vector and the router's forwarding table. The routing table has three columns. The first column is for the destination subnet, the second column indicates the identity of the next router along the shortest path to the destination subnet, and the third column indicates the number of hops to get to the destination subnet along the shortest path. Table 1 shows the routing table for router D of FIG. 6.

TABLE 1

Number of hops from source router A to various subnets

| Destination Subnet | Next Router | Number of Hops to Destination |
|---|---|---|
| w | A | 2 |
| y | B | 2 |
| z | B | 7 |
| x | — | 1 |
| ... | ... | ... |

Now suppose that 30 seconds later, router D receives from router A the advertisement shown in Table 2. This advertisement is nothing other than the routing table information from router A. This information, in particular, that subnet z is only four hops away from router A. Router D, upon receiving this advertisement, merges the advertisement with the old routing table. In particular, router D learns that there is now a path through router A to subnet z that is shorter than the path through router B. Thus, router D updates its routing table to account for the shorter shortest path, as shown in Table 2.

TABLE 2

Advertisement from router A

| Destination Subnet | Next Router | Number of Hops to Destination |
|---|---|---|
| z | C | 4 |
| w | — | 1 |
| x | — | 1 |
| ... | ... | ... |

TABLE 3

Routing table in router D after receiving advertisement from router A

| Destination Subnet | Next Router | Number of Hops to Destination |
|---|---|---|
| w | A | 2 |
| y | B | 2 |
| z | A | 5 |
| x | — | 1 |
| ... | ... | ... |

SUMMARY

A Service Layer Message Routing Service can be supported by a service layer entity (such as a CSE). With the Service Layer Message Routing Service, a service layer entity can be capable of routing the service layer messages to reach the target with optimal performance, e.g. shortest service layer distance, shortest network layer distance, least end-to-end delay, highest reliability etc.

The proposed Service Layer Message Routing Service can have one or more of the following three functions:
1. Maintain Service Layer Neighbor: This function takes charge of finding and updating the Service Layer Neighbors of the Service Layer entity due to registration or policy configuration.
2. Build Service Layer Routing Table: This function takes charge of building the Service Layer routing table, which routes a Service Layer message from a Service Layer entity to the other Service Layer entities with the optimal performance that is desired by the message originator. In one embodiment, this function is carried out when the first function (Maintain Service Layer Neighbor) is complete.
3. Route Service Layer Message: This function takes charge of routing/forwarding a service layer message by the Service Layer entity towards other service layer entities based on the Service Layer routing table. In one embodiment, this function is carried out when the second function (Build Service Layer Routing Table) is complete.

With the service layer Message Routing Service, instead of randomly forwarding a service layer message, each intermediate service layer entity can be aware of how to forward a service layer message to achieve best required performance for message delivery. The proposed Message Routing Service can achieve the overall optimal performance for various service layer metrics, with Service Layer routing involving multiple Service Layer hops.

A service layer message (either request or response message) can be associated with a service layer routing metric, such that the Service Layer Message Routing Service on an intermediate service layer entity will route the message based on the metric.

Details of ROA and SOA oneM2M embodiments of the Service Layer Message Routing Service, as well as the new resources, procedures to support the Message Routing Service are described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 7:
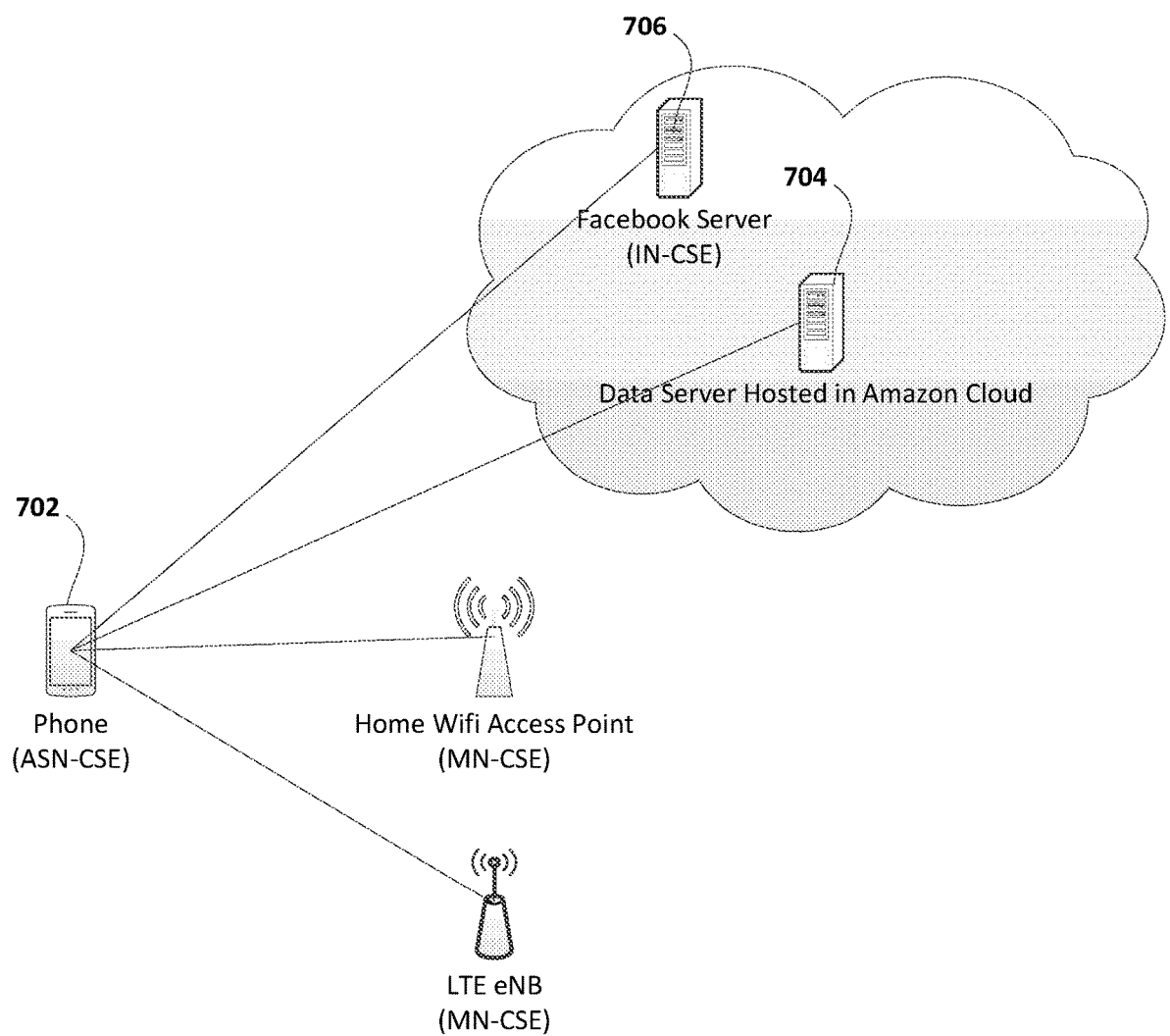
FIG. 7 is a diagram that illustrates a use case of one embodiment.

FIG. 7 is a diagram of a use case with a phone as a service layer entity that may need to register to multiple other service layer entities, e.g. the Home Wifi Access Point, the LTE eNB covering the home area, Data Server 704 hosted in Amazon Cloud, Facebook Server 706 etc. This use case is beyond the registration limitations specified in current version of the oneM2M Functional Architecture.

The phone service layer entity 702 could be an ASN-CSE in the oneM2M Functional Architecture. The Home Wifi Access Point could be an MN-CSE in the oneM2M Functional Architecture. The LTE eNB could be an MN-CSE in the oneM2M Functional Architecture. The Data Server hosted in Amazon Cloud could be an IN-CSE in the oneM2M Functional Architecture. The Facebook Server 706 could be an IN-CSE in the oneM2M Functional Architecture as well.

The Phone service layer 702 registers to the Home Wifi Access Point, the LTE eNB for certain services, for example, Communication Management and Delivery Handling, Network Service Exposure, Security etc. The phone 702 may have many applications running on it, as well as integrated sensors. There are multiple Server SLs deployed, which manage different types of data, for example, the service layer in the Data Server 704 hosted in Amazon Cloud may manage and store the data related to nature (temperature, humidity, noise, traffic, etc.), the service layer in Facebook Server 706 may manage and store the data related to social life (social applications, advertisement, etc.). The phone service layer 702 registers to the service layers in the Data Server hosted in Amazon Cloud 704 and Facebook Server 706 for the services, such as Data Management and Repository, Subscription and Notification, Location, etc. for different types of data and applications.

It is understood that the functionality illustrated in FIG. 7 may be implemented in the form of software (i.e., computer-executable instructions) stored in a memory of, and executing on a processor of, a node of an M2M network (e.g., a server, gateway, device, or other computer system), such as one of those illustrated in FIG. 26C or 26D described below.

As shown in FIG. 7, a service layer entity may need to register to multiple service layer entities for different services or applications. Furthermore, based on the pre-configured M2M request routing policies, a service layer entity may be configured to provide message routing to other service layer entities even they do not have registration relationship. On the other hand, a service layer entity can be requested by other service layer entities to provide message routing without full registration relationship.

Figure 4:
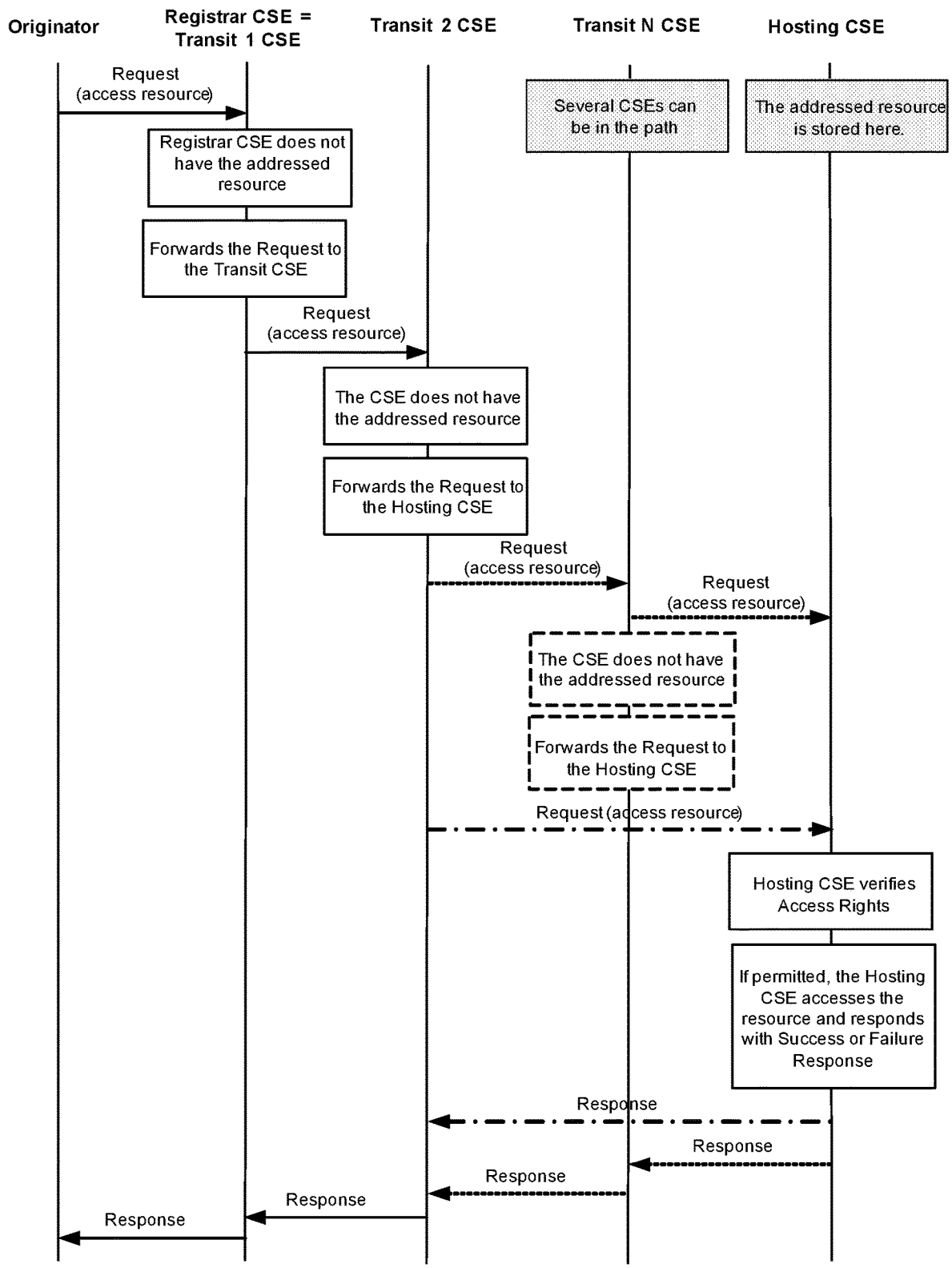
FIG. 4 shows the existing procedure of an originator accessing a resource at the Hosting CSE, which is multiple hops away.
Figure 5:
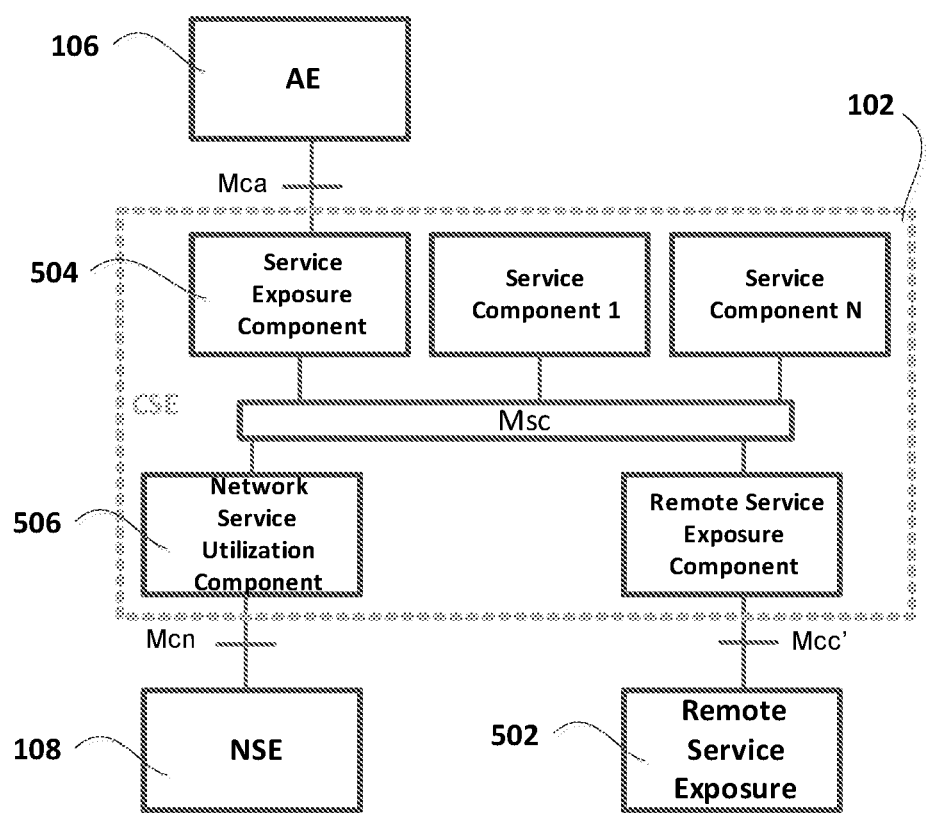
FIG. 5 is a diagram that shows a oneM2M Services Architecture.
Figure 6:
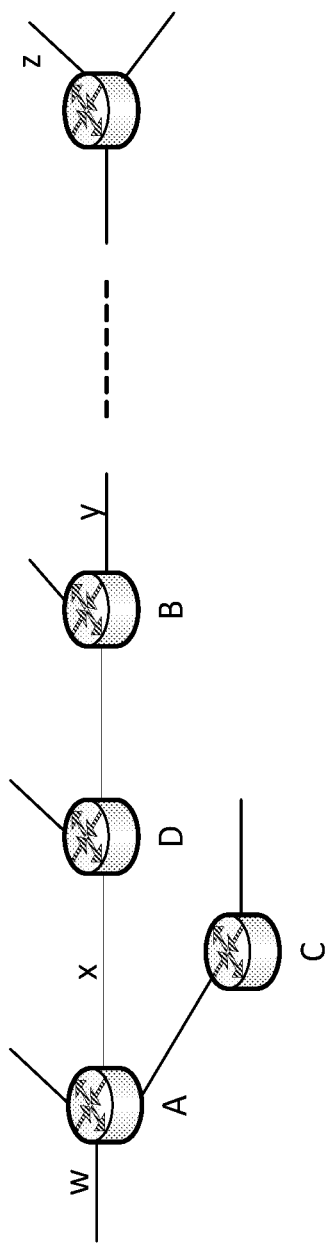
FIG. 6 is a diagram that shows a portion of an autonomous system.
Figure 8:
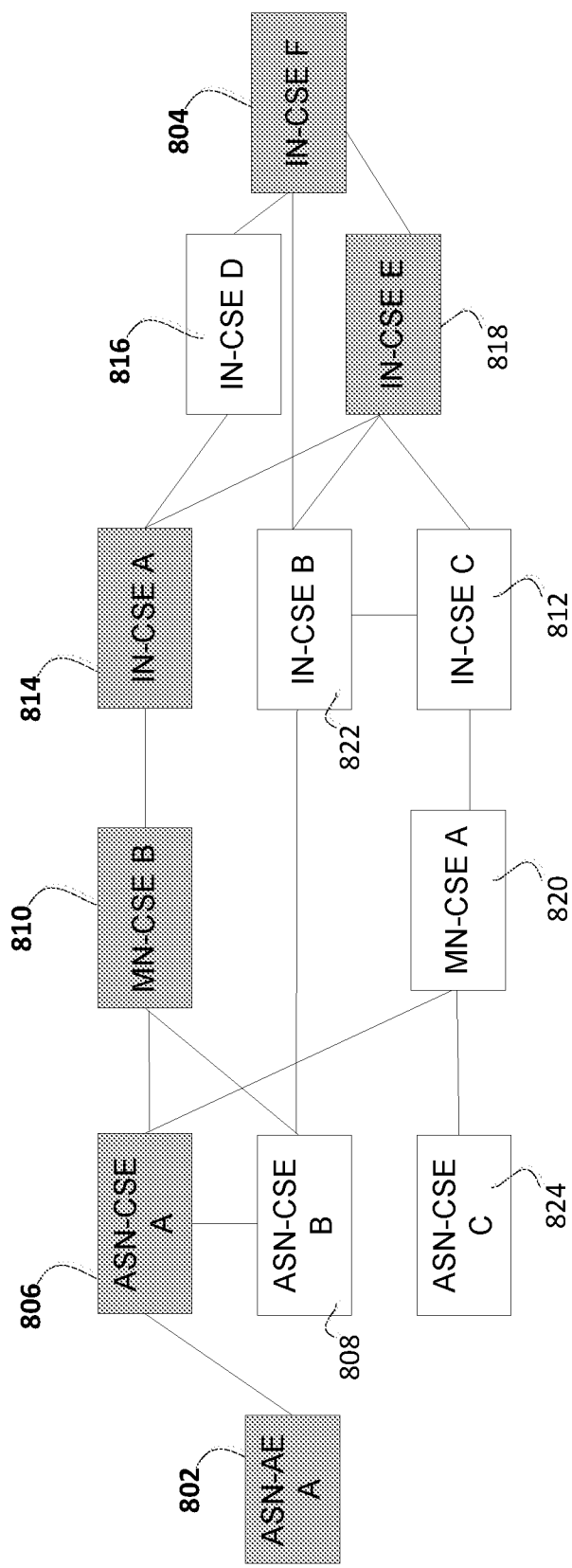
FIG. 8 is a diagram of an example of Service Layer Topology Due to Registration Relationship for Routing.

As a result, the service layer entities may form a mesh routing topology. FIG. 8 shows an example of Service Layer routing topology due to the registration relationship or pre-configured routing policies. The message routing at the Service Layer is no longer as simply hierarchically linear as the example shown in FIG. 4. An intermediate service layer entity decides which next service layer entity would be the best candidate to forward a message to the target.

As the example shown in FIG. 8, an ASN-AE A 802 wants to target a resource hosted in IN-CSE F 804. The request message will be processed as following:

When ASN-CSE A 806 receives the request message from ASN-AE A 802, it finds out that the message is not targeting itself. ASN-CSE A 806 needs to decide which next CSE it will forward the request, which could be ASN-CSE B 808, MN-CSE B, MN-CSE A 812. However, right now, ASN-CSE A 806 lacks of the capability of making this decision to find the best next CSE (i.e. choose among ASN-CSE B 808, MN-CSE B 810, MN-CSE A 812) to forward the message. ASN-CSE A may randomly choose MN-CSE B to forward the request message.

When MN-CSE B 810 receives the request message from ASN-CSE A 806, it finds out that it is not targeting itself. MN-CSE B only registers to IN-CSE A 814, thus based on the oneM2M Functional Architecture, MN-CSE B 810 will forward the message to IN-CSE A 814.

When IN-CSE A 814 receives the request message from MN-CSE B 810, it finds out that it is not targeting itself. IN-CSE A 814 needs to decide which next CSE it will forward the request, which could be IN-CSE D 816 and IN-CSE E 818. However, right now, IN-CSE A 814 lacks of the capability of making this decision to find the best next CSE to forward the message. IN-CSE A 814 may randomly choose IN-CSE E 818 to forward the request message.

When IN-CSE E 818 receives the request message from IN-CSE A 814, it finds out that it is not targeting itself. IN-CSE E 818 needs to decide which next CSE it will forward the request, which could be IN-CSE F 804 since it is the target CSE.

When IN-CSE F 804 receives the request message from IN-CSE E 818, it finds out that the request message is targeting itself. IN-CSE F 804 will handle the request and prepare the response message for the originator ADN-AE A 802.

In summary, there could be multiple potential service layer routing paths for the request message from ASN-AE A 802 to IN-CSE F 804, e.g. ASN-AE A 802->ASN-CSE A 806->MN-CSE B 810->IN-CSE A 814->IN-CSE E 818->IN-CSE F 804. However, the routing path may not be the optimal or best one according to different message delivery requirement. Thus an intermediate service layer entity is not able to make the optimal choice in selecting the next service layer entity in order to reach the target with the best performance, e.g. shortest service layer distance, shortest roundtrip delay, highest overall reliability etc. Note, the underlying network layer routing between each adjacent service layer entity pairs is taken care by the network layer routing protocols, i.e. there might be multiple network layer nodes (routers) involved between each adjacent service layer entity pairs.

It is understood that the functionality illustrated in FIG. 8 may be implemented in the form of software (i.e., computer-executable instructions) stored in a memory of, and executing on a processor of, a node of an M2M network (e.g., a server, gateway, device, or other computer system), such as one of those illustrated in FIG. 26C or 26D described below.

Currently the service layer message routing specified in the oneM2M Functional Architecture is hop-by-hop based on service layer registration relationship. This can cause sub-optimal message deliveries. The routing protocols that are used at the Network Layer, such as RIP are not applicable to the Service Layer for the following reasons:

The Network Layer routing protocols do not consider any Service Layer specific information, such as node sleeping schedule, node service capability, etc. Thus the performance achieved would not be optimal based on those service layer metrics.

The service layer messages could be forwarded by multiple service layer entities as well as the service layer topology shown in FIG. 8. The Network Layer routing protocols can only provide the routing by the underlying network routers between each pair of the two adjacent service layer entities (e.g. between ASN-CSE A 806 and MN-CSE B 810, between MN-CSE B 810 and IN-CSE A 814 etc.). The Network Layer routing protocols cannot provide the overall optimal performance considering all the Service Layer hops involved in a service layer message delivery.

Figure 9:
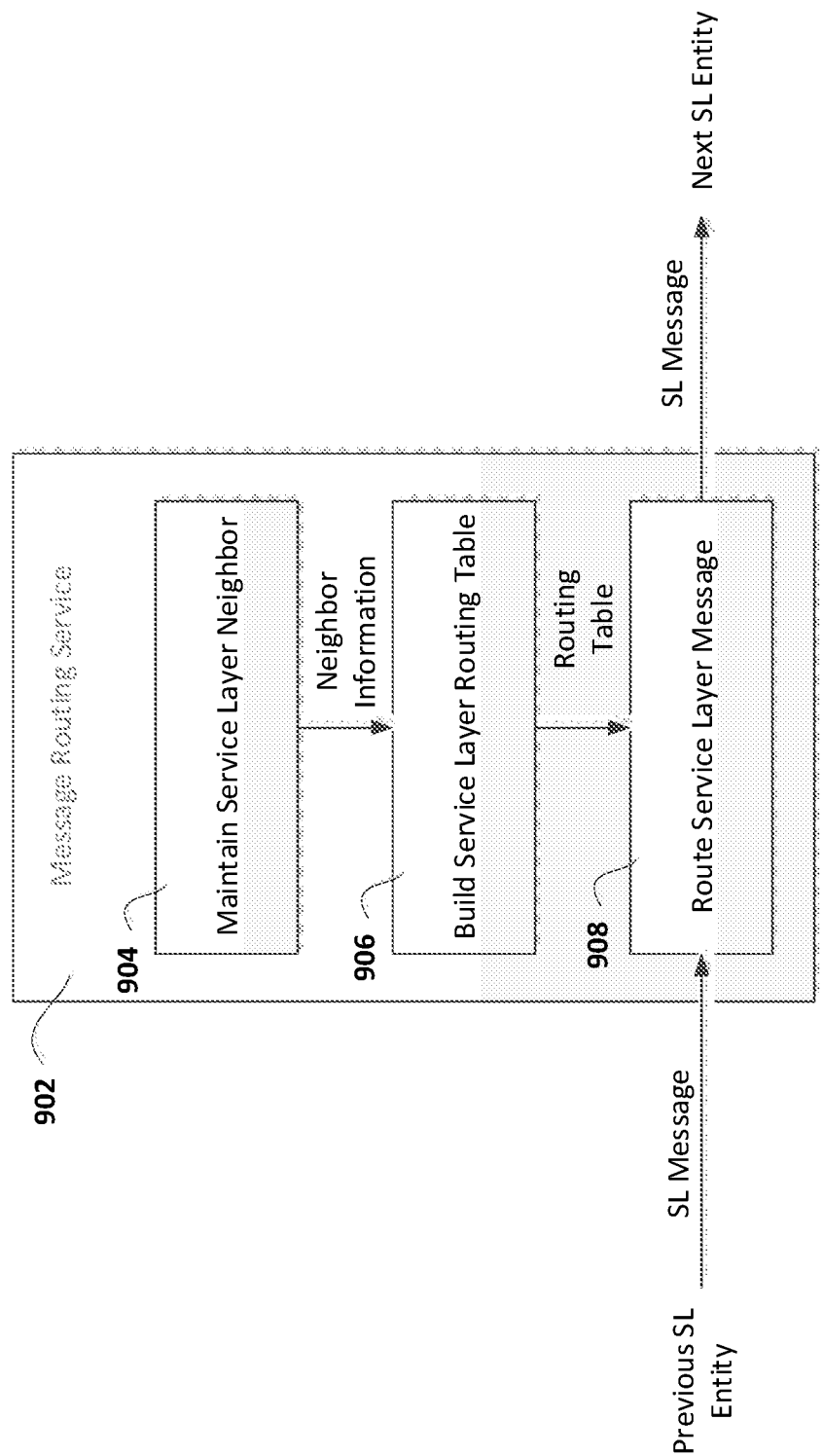
FIG. 9 is a diagram of a High Level Architecture of Message Routing Service.

FIG. 9 is a diagram of a Service Layer Message Routing Service 902 at the Service Layer. The Service Layer Message Routing Service 902 is sometimes referred to as Message Routing Service 902 for simplicity. The Service Layer Message Routing Service 902 the capability that an originator service layer entity helps route and forward Service Layer message to the target service layer entity. In general, the Message Routing Service 902 is a service that a registrar entity (e.g. an IN-CSE) may provide to a registree entity (e.g. an MN-CSE), and vice versa. The Message Routing Service 902 may also be considered as a special service for entities without registration relationship.

By default, the Message Routing Service 902 can be mutual and bidirectional. When a registrar entity grants access of this Message Routing Service to its registree entity, the registree entity can automatically provide the Message Routing Service 902 for the registrar entity as well. Note, although this could be the default setting of the Message Routing Service 902, the service can be set up as unidirectional. For illustration purposes, in the following, we regard the Message Routing Service 902 as bidirectional. The described mechanisms apply to both bidirectional and unidirectional routing service.

The proposed Message Routing Service 902 running on an service layer entity can have three components. FIG. 9 shows the high level architecture of the Message Routing Service 902. The 'Maintain Service Layer Neighbor' Component 904 collects and maintains the service layer neighbors' information. The neighbor information can be utilized to build service layer routing tables, as the 'Build Service Layer Routing Table' Component 906. The service layer message from the previous service layer entity can be routed to the next service layer entity, which is taken care of by the 'Route Service Layer Message' Component 908.

It is understood that the functionality illustrated in FIG. 9 may be implemented in the form of software (i.e., computer-executable instructions) stored in a memory of, and executing on a processor of, a node of an M2M network (e.g., a server, gateway, device, or other computer system), such as one of those illustrated in FIG. 26C or 26D described below.

Maintain Service Layer Neighbor Component 904

In one embodiment, a service layer entity A is considered as a service layer neighbor to another service layer entity B under the following circumstances:

(1) Full Registration: An service layer entity A registers to another service layer entity B for all the services of B. The service layer entity B as a registrar entity, forwards the service layer entity A's message. The service layer entity A as a registree entity, also forwards the service layer entity B's message.

For the full registration scenario, a service layer entity maintains the information of the service layer entities that have registered to itself, as well as those itself has registered to. As a result, all registree entities and registrar entities of the service layer entity are its service layer neighbors.

(2) Flexible Service Request: a service layer entity A requests another service layer entity B only for the Message Routing Service provided by the service layer entity B. After granting this service, the service layer entity B forwards the service layer entity A's message. If we consider the Message Routing Service 902 as bidirectional, then the service layer entity A also helps forward the service layer entity B's message.

For the flexible service request scenario, a service layer entity maintains all the granted services from other service layer entities. For those service layer entities that have granted the Message Routing Service 902 to the service layer entity, they are considered as its service layer neighbors.

(3) Policy configuration: a service layer entity A is pre-configured with certain policies that it will help routing another service layer entity B's messages as described.

For the policy configuration scenario, a service layer entity A maintains the information of the service layer entities that are contained in the routing polices. The routing polices regulate how service layer entity routes messages for other service layer entities, which are considered as its service layer neighbors. If the Message Routing Service 902 is bidirectional, the service layer entity A can inform other service layer entities about the pre-configured routing polices such that other service layer entities also help routing messages from the service layer entity A.

Based on different measurement metrics, the routing weight between a pair of Service Layer entities can be different. The following shows some examples of measurement metrics:

Service Layer Hop can be defined as the number of service layer hops between two service layer entities. For a pair of service layer neighbors, the weight is always 1.

Network Layer Hop can be defined as the number of the underlying network layer hops between two service layer entities. For a pair of service layer neighbors, although the weight based on Service Layer distance is only 1, the weight based on network layer hop can be more than 1. In other words, there could be multiple network layer hops between two service layer entities. This weight can be measured by a service layer entity, for instance, to send a traceroute request to one of its service layer neighbors. The traceroute response will contain the list of network layer nodes between the two service layer neighbors.

End-to-End Delay can be defined as the time duration from the time instant that one service layer entity sends out a probing message to the time instant that the service layer entity receives the confirmation regarding the probing message (a virtual resource named probing can be proposed to be accessed in a RESTful way. When the virtual resource is accessed, the probing is carried out). It may be measured by a source service layer entity sending a probing message (e.g. a Ping message) to another service layer entity, which confirms the receipt of the probing message to the source service layer entity. The source service layer entity calculates the end-by-end delay by subtracting the two times when the probing message was sent and the confirmation message from the other service layer entity arrived.

Average Message Buffering Capability can be defined as the average buffer size of the two service layer entities. The buffer size can be obtained by a service layer entity sending a retrieval message to another service layer entity. The average data buffer size will be averaged between the buffer sizes of the two service layer entities. Note (1), the existing shortest path algorithm should be adapted to find the path with the largest total weight. Note (2), because we are considering that the Message Routing Service 902 is bidirectional, thus the metric is chosen as average data buffering capability. If we consider the Message Routing Service 902 is uni-directional, the metric is chosen as data buffering capability of the neighbor. On service layer link between two service layer entities, the weight could be different. The Note (1) also applies to the following metrics: average node capacity, average node processing capability. The Note (2) also applies to the following metrics: average node capacity, average node sleeping period, average node processing capability.

Average Node Capacity can indicate whether the service layer entity is resource constrained or not. If a service layer entity is resource constrained, then it can be determined that the service layer entity has a low weight based on the node capacity metric. Alternatively, if a service layer entity is not resource constrained, then it can be determined that the service layer entity has a high weight based on the node capacity metric. The average node capacity of a path between two service layer entities can be an average between the node capacities of the two service layer entities.

Average Node Sleeping Period can be defined as how long a service layer entity sleeps. For example if a service layer entity sleeps 15 minutes every hour, then the node sleeping period is defined as 15 minutes. The average node capacity of a path between two service layer entities can be an average between the sleeping periods of the two entities.

Average Node Processing Capability can be defined as how quickly the service layer entity is able to process a service layer message (i.e. waiting time plus the processing time). The average node processing capability will be average between the node processing capacities of the two service layer entities.

Figure 10:
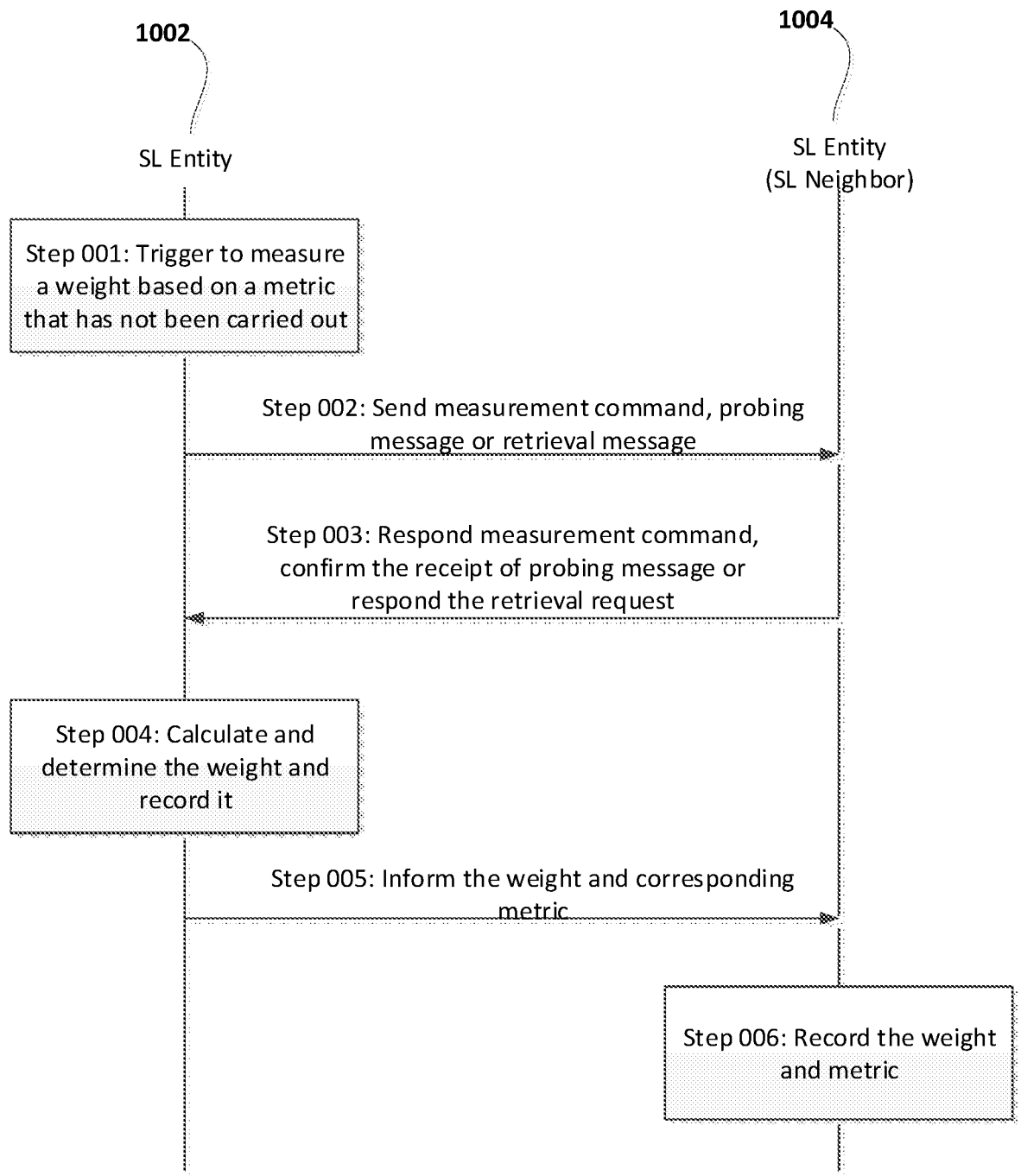
FIG. 10 is a diagram of a Message Flow of Weight Measurement.

FIG. 10 shows a diagram of a procedure of the weight measurement for a pair of neighbors (measurement can also be carried out by multicasting from one service layer entity 1002 to its service layer neighbors):

In step 001 of FIG. 10, a service layer entity 1002 is triggered to measure a weight based on a metric that has not been carried out or needs to be updated. The trigger could be that the service layer entity 1002 wants to obtain and update the weights for all or some neighbors for a provisioned or a new metric. For example, a triggering factor could be a new neighbor is established due to a new registration relationship. A metric may be provisioned and known to the service layer entity that the weight based on this metric can be measured after the service layer entity registration to other service layer entities is done.

A metric may be known to the service layer entity 1002 when the service layer entity finds the metric contained in a request or response message that it does not have measurement or routing table maintained for the service layer entity 1002 (the details will be shown in the following sections). The service layer entity 1002 decides on how to do the measurement, as discussed earlier, by sending a traceroute command, or by sending a probing message, retrieval message etc. a service layer entity 1002 can also subscribe to the context information of its service layer neighbor, for example, message buffering capacity, node capacity, node sleeping period, node processing capacity. The service layer entity will receive notifications of the information update. a service layer entity 1002 will also update the neighbor information when the neighbor deregisters, becomes offline, etc.

In step 002 of FIG. 10, the service layer entity sends the measurement command, probing message or retrieval message to each of the service layer neighbors, either by unicasting, or multicasting. In FIG. 10, we only show the example of unicasting from the service layer entity 1002 to its service layer neighbor 1004. Note, a probing message or retrieval message may be used to obtain measurement for multiple metrics.

In step 003 of FIG. 10, the service layer neighbor 1004 responds the measurement command or confirms the receipt of the probing message to the service layer entity 1002.

In step 004 of FIG. 10, the service layer entity 1002 calculates or extracts the weight from the response message, and records it.

In step 005 of FIG. 10, the service layer entity 1002 also informs the weight and the corresponding metric to service layer neighbor. For bidirectional operation of the Message Routing Service 902, the weight between the two neighbors can be the same for both directions. The service layer neighbor 1004 does not need to carry out the measurement procedure again.

In step 006 of FIG. 10, the service layer neighbor 1002 records the weight and the metric.

Figure 26A:
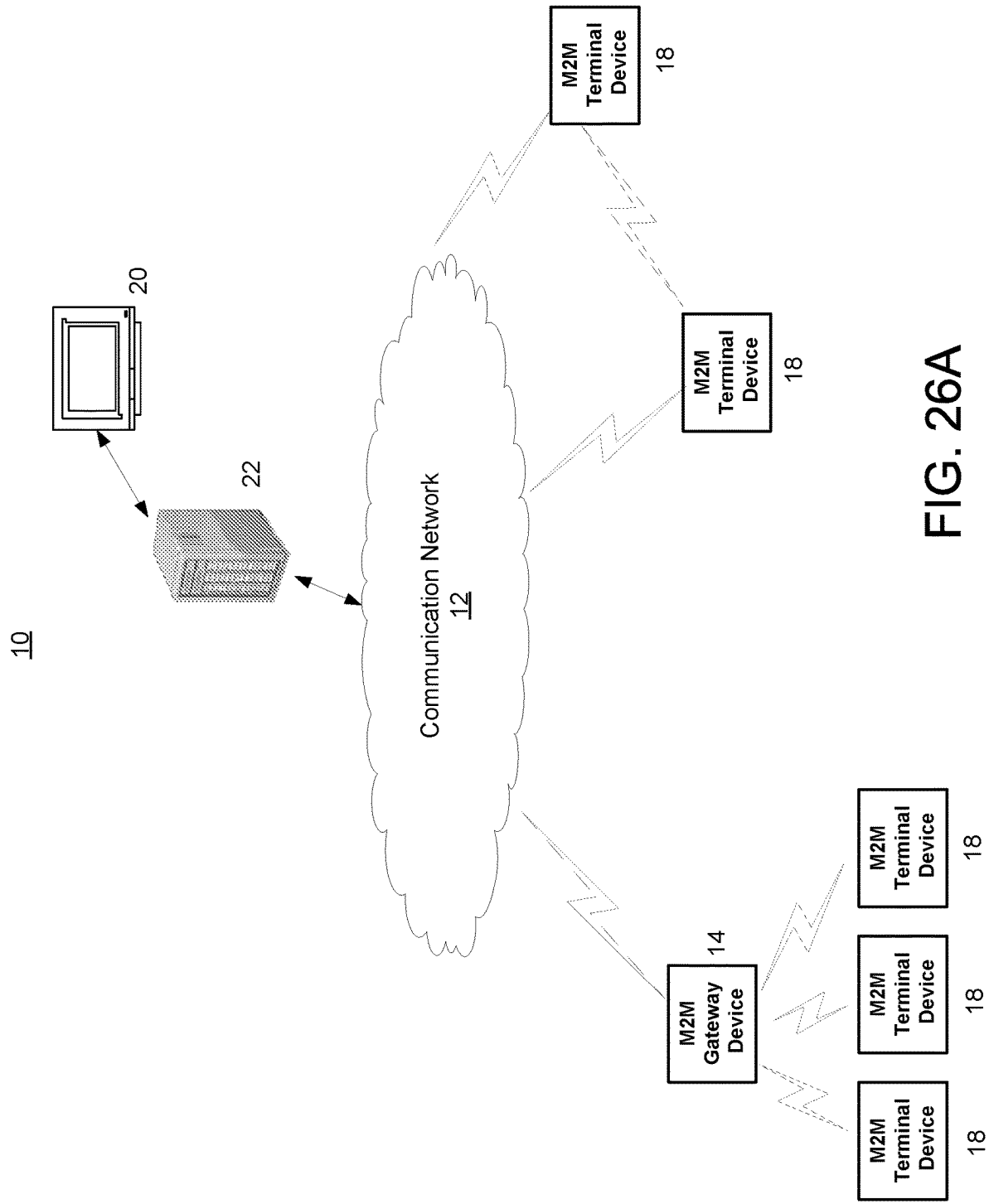
FIG. 26A is a diagram of an example machine-to machine (M2M) or Internet of Things (IoT) communication system in which one or more disclosed embodiments of IoT event management systems and methods may be implemented.
Figure 26B:
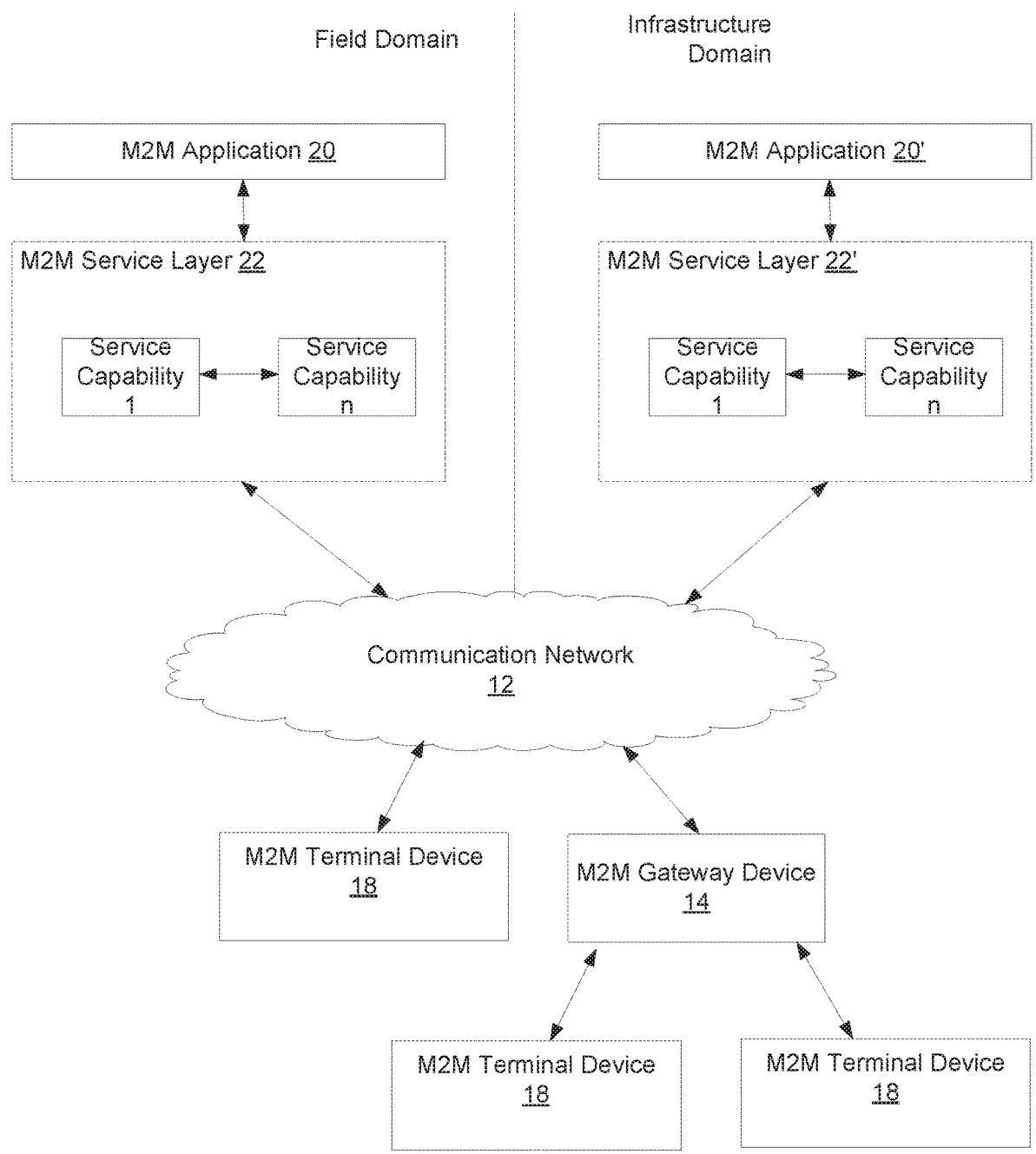
FIG. 26B is a system diagram of an example architecture that may be used within the M2M/IoT communications system illustrated in FIG. 26A.
Figure 26C:
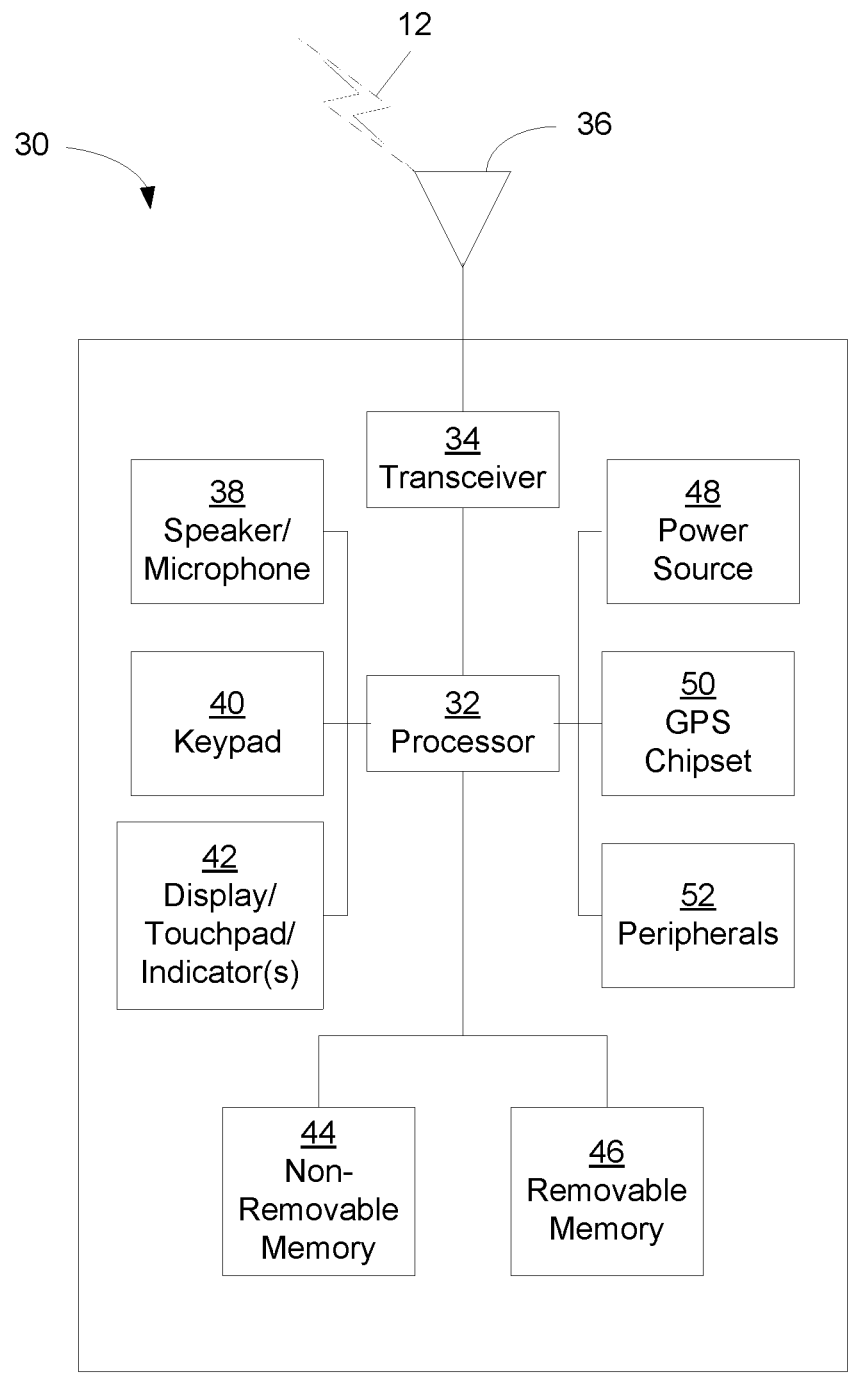
FIG. 26C is a system diagram of an example M2M/IoT terminal or gateway device that may be used within the communications system illustrated in FIG. 26A.
Figure 26D:
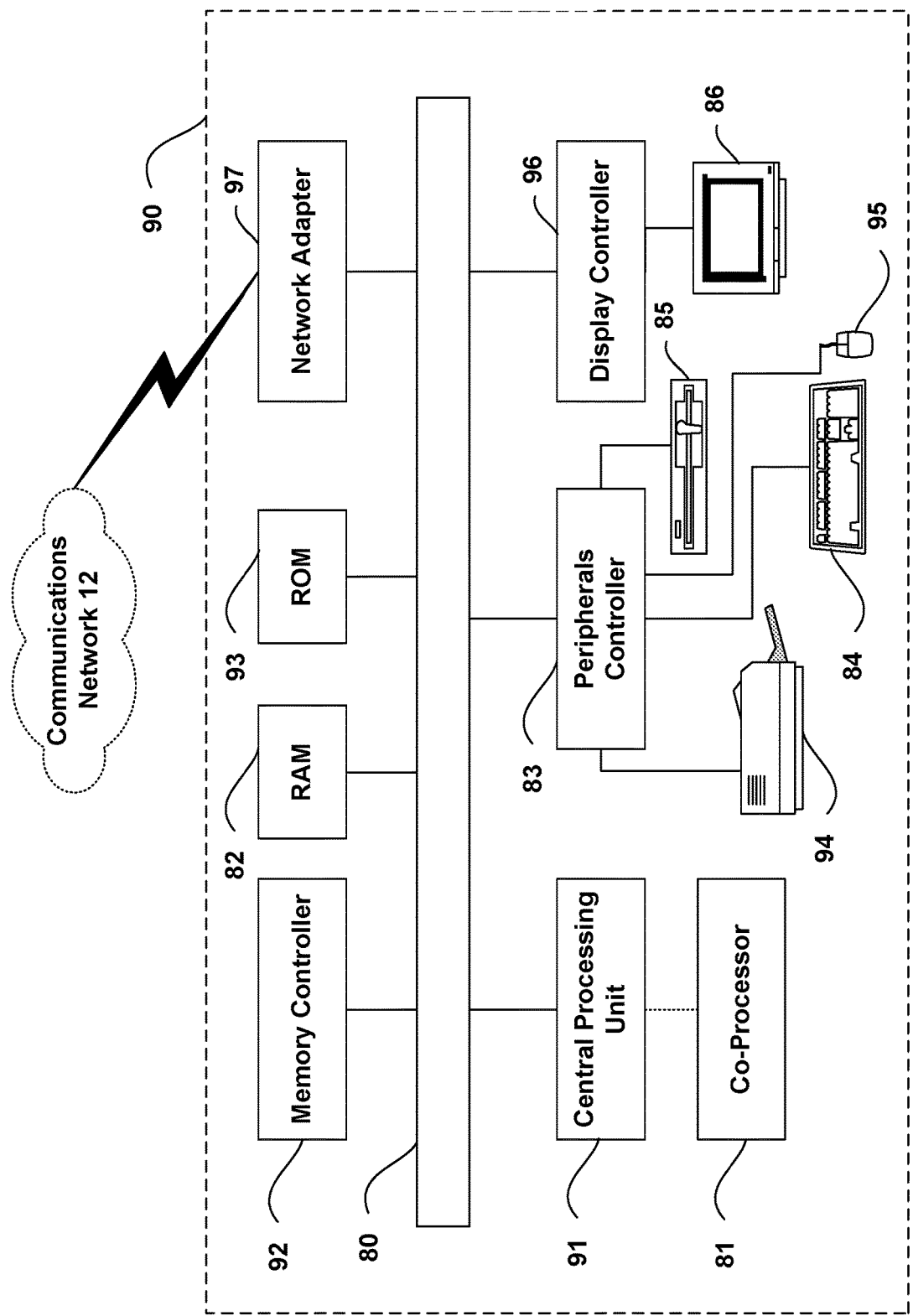
FIG. 26D is a block diagram of an example computing system in which aspects of the communication system of FIG. 26A may be embodied.

It is understood that the entities performing the steps illustrated in FIG. 10 are logical entities that may be implemented in the form of software (i.e., computer-executable instructions) stored in a memory of, and executing on a processor of, a network node or computer system such as those illustrated in FIG. 26C or FIG. 26D. That is, the method(s) illustrated in FIG. 10 may be implemented in the form of software (i.e., computer-executable instructions) stored in a memory of a network node, such as the node or computer system illustrated in FIG. 26C or FIG. 26D, which computer executable instructions, when executed by a processor of the node, perform the steps illustrated in FIG. 10

It is also understood that any transmitting and receiving steps illustrated in FIG. 10 may be performed by communication circuitry of the node under control of the processor of the node and the computer-executable instructions (e.g., software) that it executes.

Each service layer entity can keep records of the neighbors' information as shown in Table 4, where each row corresponds to a service layer neighbor of the service layer entity 1002.

Each service layer neighbor 1004 can be uniquely identified by a service layer identifier. For example, it could be the CSE-ID, CSEBase in the oneM2M Functional Architecture.

Neighbor Type indicates how the service layer entity is considered as a service layer neighbor of the current service layer entity. As discussed in the beginning of this section, the service layer neighbor could be:

A full registrar of the current service layer entity. The current service layer entity registers to the service layer entity as in the full registration scenario.

A full registree of the current service layer entity. The current service layer entity is registered by the service layer by the service layer entity in the full registration scenario.

An service layer entity granting access and providing the Message Routing Service to another service layer entity in the flexible service request scenario.

An service layer entity providing the Message Routing Service to another service layer entity due to the pre-configured routing polices.

Measurement indicates the weight value and the corresponding metric. Note the measurement can be multiple if multiple metrics are used.

TABLE 4 service layer Neighbor Record

| SL Identifier | Registration Type | Measurement |
|---|---|---|
| | 1 - full registrar<br>2 - full registree<br>3 - SL entity providing Message Routing Service due to flexible service request<br>4 - SL entity providing Message Routing Service due to pre-configured policies. | Metric, weight |

Build Service Layer Routing Table Component 906

A service layer entity may maintain multiple routing tables based on what metrics are used. The routing table for a particular metric can have the fields as shown in Table 5:

Target service layer Entity can indicate the service layer identifier of the destination service layer entity.

Next service layer Entity can indicate the next service layer entity that a message should be forwarded to reach the target service layer entity.

Total weight can indicate the total weight between the current service layer entity and the target service layer entity, which is the sum of the weight between each neighboring service layer entities on the path.

Metric can indicate the metric that the routing table is based on. Note, the value of the metric field needs to be universal among all service layer entities. In other words, every service layer entity has the same understanding on a metric and its name/identifier.

Valid time can indicate how long the routing entry is considered to be valid.

TABLE 5 service layer Routing Table

| target service layer Entity | next service layer Entity | metric | total weight | valid time |
|---|---|---|---|---|
| ASN-CSE B | ASN-CSE B | Service Layer Hop | 1 | 4 hours |

A service layer entity can build the routing table by following the procedures (in the following example we use the metric of Service Layer Distance and the service layer routing topology shown in FIG. 8 as the example to show how the routing table is built):

Each service layer entity (for example ASN-CSE A in FIG. 8) puts all its neighbors into the routing table, each of which corresponds to a target service layer entity entry. The next service layer entity is the neighbor itself, and the total weight is 1 as shown in Table 6 and Table 7. In the following routing tables, the valid time field and metric are not illustrated. We consider the metric is Service Layer Hop. We consider the routing entries are valid during the routing table building process.

TABLE 6

Routing Table on ASN-CSE A (1)

| target service layer Entity | next service layer Entity | total weight |
|---|---|---|
| ASN-CSE B | ASN-CSE B | 1 |
| MN-CSE B | MN-CSE B | 1 |
| MN-CSE A | MN-CSE A | 1 |

TABLE 7

Routing Table on MN-CSE A (1)

| target service layer Entity | next service layer Entity | total weight |
|---|---|---|
| ASN-CSE A | ASN-CSE A | 1 |
| ASN-CSE C | ASN-CSE C | 1 |
| IN-CSE C | IN-CSE C | 1 |

Each service layer entity retrieves or subscribes to the routing table in its neighbor service layer entities. For example ASN-CSE A 806 retrieves the routing table in ASN-CSE B 808, MN-CSE B 810, MN-CSE A 802.

On receiving the routing table from the neighbor service layer entities, each service layer entity can process each entity based on the following rules:

If there is no route entry matching the one received then the service layer entity entry is added automatically. The distance attribute is updated corresponding to the received one (received distance+the distance between the service layer entity and the neighboring CSE). The next service layer entity is updated to the neighbor service layer entity where the routing table is from. For example, the entry ASN-CSE C 824, IN-CSE C 812 in the routing table of MN-CSE A shown in Table 7, is a new entry to ASN-CSE A 806. Then ASN-CSE C 824, IN-CSE C are added to the routing table of ASN-CSE A 806. The next service layer Entity is MN-CSE A 814, the distance is set to 2. Shortly, ASN-CSE A 806 receives a notification of the update on the routing table on MN-CSE A 820 in Table. Similarly, a new entry IN-CSE B 822 in bold in Table 10 is added to the routing table of ASN-CSE A 806.

TABLE 8

Routing Table on ASN-CSE A (2)

| target service layer Entity | next service layer Entity | total weight |
|---|---|---|
| ASN-CSE B | ASN-CSE B | 1 |
| MN-CSE B | MN-CSE B | 1 |
| MN-CSE A | MN-CSE A | 1 |
| ASN-CSE C | MN-CSE A | 2 |
| IN-CSE C | MN-CSE A | 2 |

TABLE 9

Routing Table on MN-CSE A (2)

| target service layer Entity | next service layer Entity | total weight |
|---|---|---|
| ASN-CSE A | ASN-CSE A | 1 |
| ASN-CSE C | ASN-CSE C | 1 |
| IN-CSE C | IN-CSE C | 1 |
| IN-CSE B | IN-CSE C | 2 |

TABLE 10

Routing Table on ASN-CSE A (3)

| target service layer Entity | next service layer Entity | total weight |
|---|---|---|
| ASN-CSE B | ASN-CSE B | 1 |
| MN-CSE B | MN-CSE B | 1 |
| MN-CSE A | MN-CSE A | 1 |
| ASN-CSE C | MN-CSE A | 2 |
| IN-CSE C | MN-CSE A | 2 |
| IN-CSE B | MN-CSE A | 3 |

If there are matching entries but the distance attribute is lower than the one already stored in the routing resource, then the routing is updated with the new route. For example, ASN-CSE A 806 receives the routing table on ASN-CSE B 808 shown in Table 11. There is an entry IN-CSE B shown in purple, which has a lower distance than the existing one, then the next service layer entity is updated to ASN-CSE B 808 and the distance is updated to 2 as shown in Table 12

TABLE 11

Routing Table on ASN-CSE B (1)

| target service layer Entity | next service layer Entity | total weight |
|---|---|---|
| ASN-CSE A | ASN-CSE A | 1 |
| MN-CSE B | MN-CSE B | 1 |
| IN-CSE B | MN-CSE B | 1 |

TABLE 12

Routing Table on ASN-CSE A (4)

| target service layer Entity | next service layer Entity | total weight |
|---|---|---|
| ASN-CSE B | ASN-CSE B | 1 |
| MN-CSE B | MN-CSE B | 1 |
| MN-CSE A | MN-CSE A | 1 |
| ASN-CSE C | MN-CSE A | 2 |
| IN-CSE C | MN-CSE A | 2 |
| IN-CSE B | ASN-CSE B | 2 |

Figure 1:
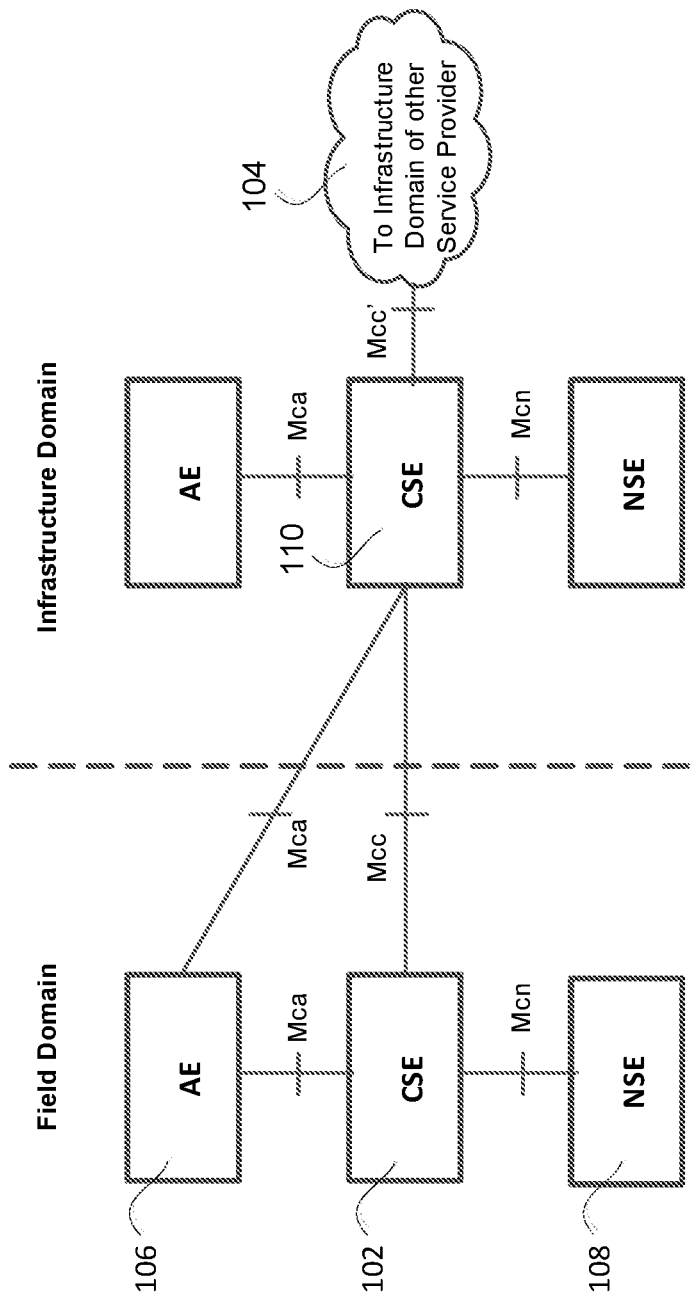
FIG. 1 is a diagram that shows a oneM2M architecture.
Figure 2:
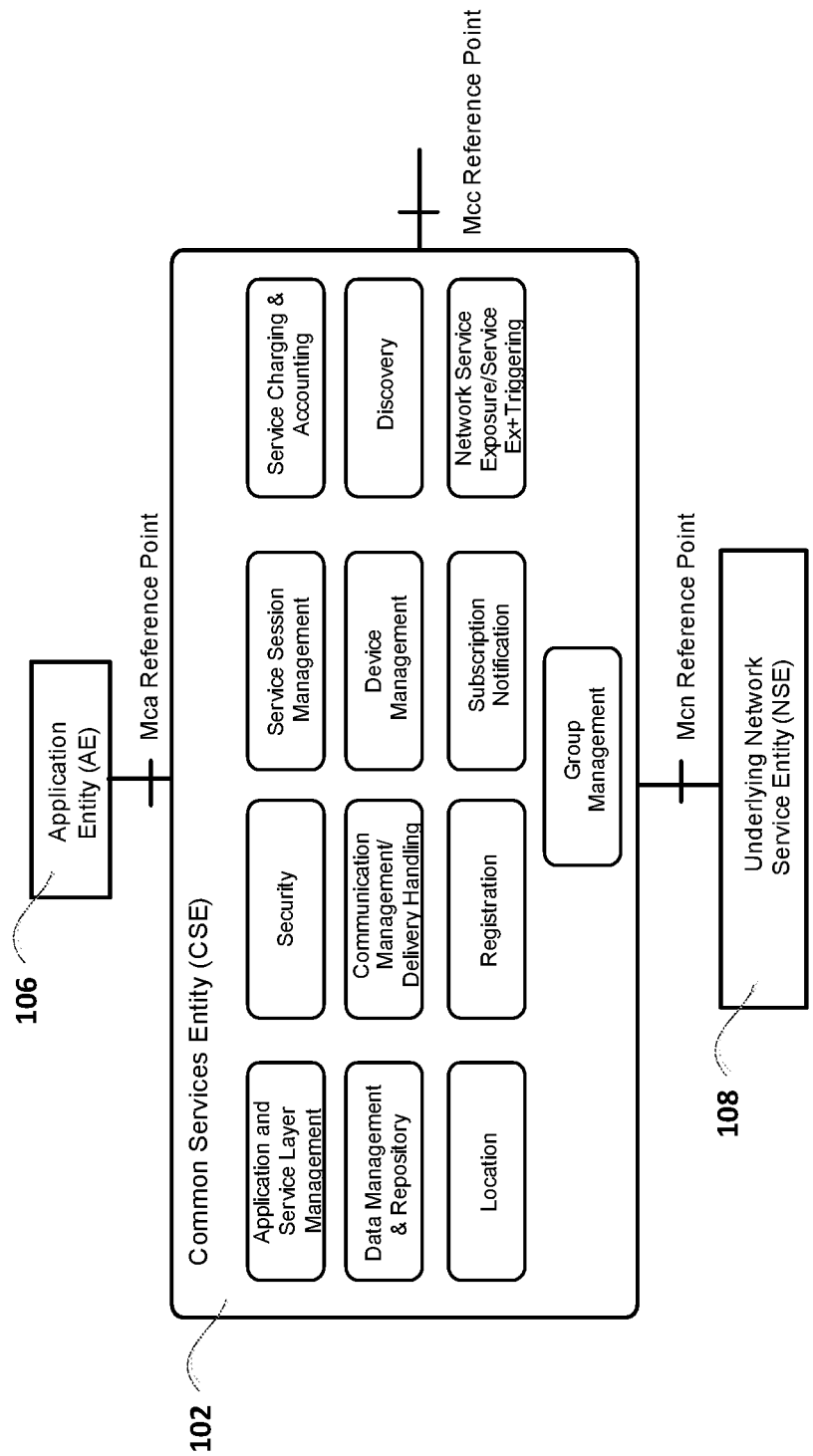
FIG. 2 is a diagram that shows oneM2M Common Service Functions.
Figure 3:
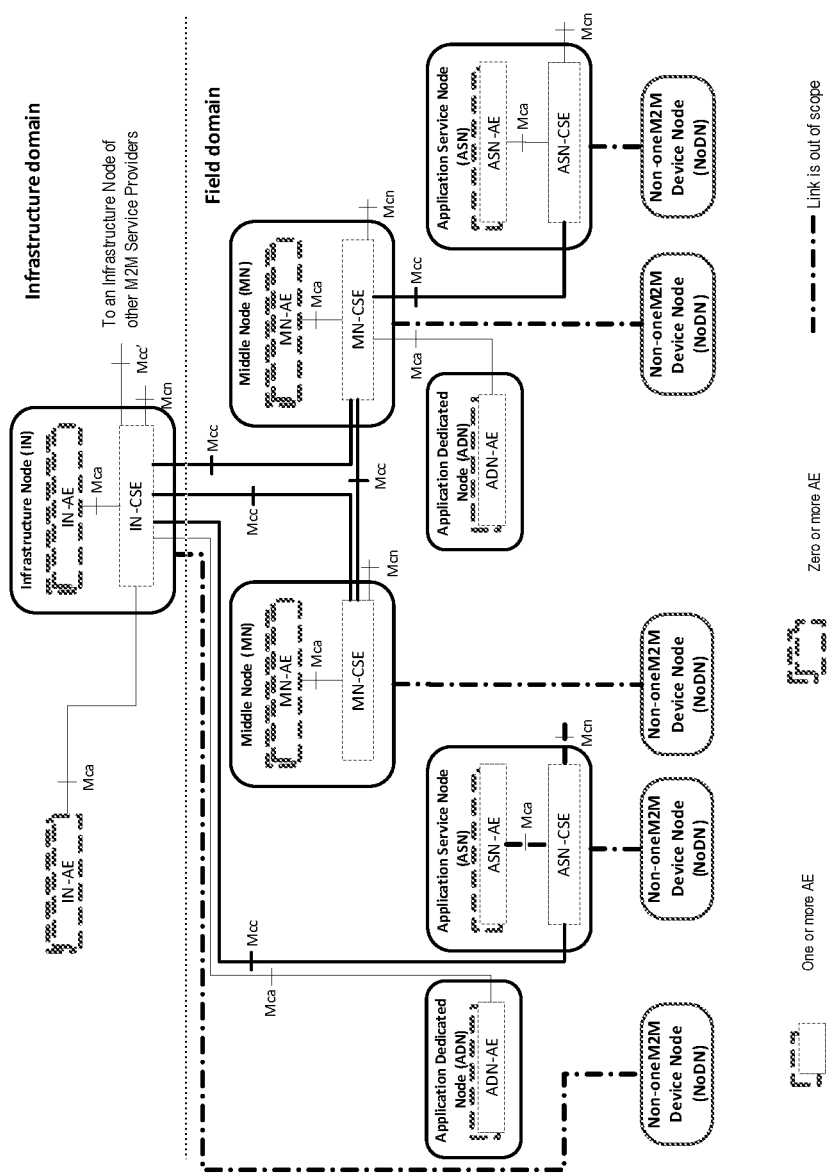
FIG. 3 is a diagram that shows configurations supported by oneM2M Architecture.

If there is a matching entry but the total weight attribute is higher than the one already in its routing resource, then a Stability timer can be started. If after the Stability timer expires and still the neighbor service layer entity is sending the same higher distance then the total weight is updated into its routing table. For example, ASN-CSE B 808 deregistered from MN-CSE B 810, thus the service layer topology is updated to the one shown in FIG. 1. 1 The total weight to ASN-CSE B 808 can be updated to Infinity as shown in Table 13 When the neighbor IN-CSE A receives this updated routing table from MN-CSE B, it finds that there is a matching entry ASN-CSE B 808 with higher total weight than the current on as shown in Table 14. Then IN-CSE A 814 can set up a Stability timer. Before the Stability timer expires, the MN-CSE B 810 already updates the routing entry of ASN-CSE B 808 to the one shown in Table 15. and notifies IN-CSE A 814. But the total weight is still higher than the previous one shown in Table 14, the Stability timer is refreshed. IN-CSE A retrieves the routing table from MN-CSE B 810 multiple times. When the Stability timer expires, it finds that the total weight keeps the same as 3, then the routing entry of ASN-CSE B 808 is updated as the one shown in Table 16.

Figure 11:
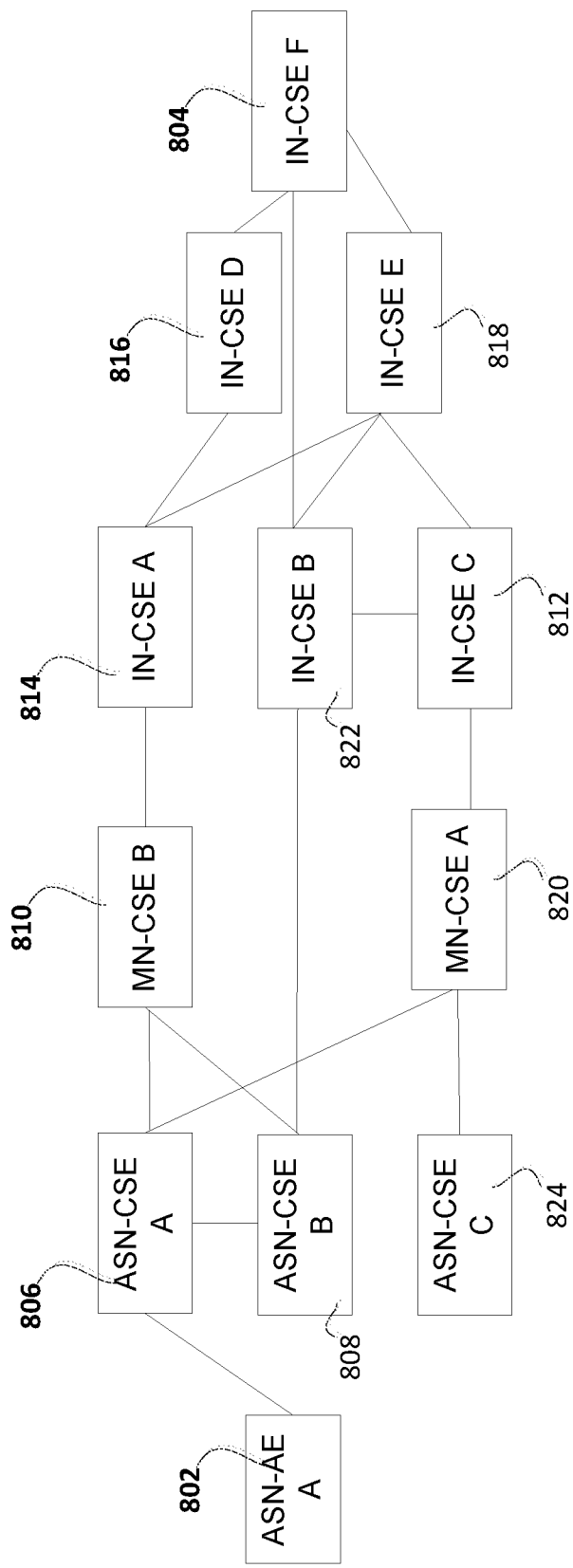
FIG. 11 is a diagram of an updated Service Layer Topology

It is understood that the functionality illustrated in FIG. 11 may be implemented in the form of software (i.e., computer-executable instructions) stored in a memory of, and executing on a processor of, a node of an M2M network (e.g., a server, gateway, device, or other computer system), such as one of those illustrated in FIG. 26C or 26D described below.

TABLE 13

Routing Table on MN-CSE B (1)

| target service layer Entity | next service layer Entity | total weight |
| --- | --- | --- |
| ASN-CSE A | ASN-CSE A | 1 |
| IN-CSE A | IN-CSE A | 1 |
| ASN-CSE B | | Infinity |

TABLE 14

Routing Table on IN-CSE A (1)

| target service layer Entity | next service layer Entity | total weight |
| --- | --- | --- |
| MN-CSE B | MN-CSE B | 1 |
| IN-CSE D | IN-CSE D | 1 |
| IN-CSE E | IN-CSE E | 1 |
| ASN-CSE B | MN-CSE B | 2 |

TABLE 15

Routing Table on MN-CSE B (2)

| target service layer Entity | next service layer Entity | total weight |
| --- | --- | --- |
| ASN-CSE A | ASN-CSE A | 1 |
| IN-CSE A | IN-CSE A | 1 |
| ASN-CSE B | ASN-CSE A | 2 |

TABLE 16

Routing Table on IN-CSE A (2)

| target service layer Entity | next service layer Entity | total weight |
| --- | --- | --- |
| MN-CSE B | MN-CSE B | 1 |
| IN-CSE D | IN-CSE D | 1 |
| IN-CSE E | IN-CSE E | 1 |
| ASN-CSE B | MN-CSE B | 3 |

After many rounds of iterations and updates, the routing table on each service layer entity will be converged and stable. Table 17 shows an example of the stable routing table on ASN-CSE A 806. Note this routing table is still based on the service layer topology shown in FIG. 8.

TABLE 17

Routing Table on ASN-CSE A (Stable)

| target service layer Entity | next service layer Entity | total weight |
| --- | --- | --- |
| ASN-CSE B | ASN-CSE B | 1 |
| MN-CSE B | MN-CSE B | 1 |
| MN-CSE A | MN-CSE A | 1 |
| ASN-CSE C | MN-CSE A | 2 |
| IN-CSE C | MN-CSE A | 2 |
| IN-CSE B | ASN-CSE B | 2 |
| IN-CSE A | MN-CSE B | 2 |
| IN-CSE D | MN-CSE B | 3 |
| IN-CSE E | ASN-CSE B | 3 |
| IN-CSE F | ASN-CSE B | 3 |

Route Service Layer Message Component 908

A service layer message (either request or response message) can be associated with a service layer routing metric. If the service layer routing metric presents, it indicates the service layer message source wants the message to be delivered to achieve the best performance according to the specified metric. The service layer routing metric could be the ones and/or combination of them listed above, i.e. Service Layer Hop, Network Layer Hop, End-to-End Delay, etc. Thus two new parameters named reqMetric, resMetric can be added to the request message:

reqMetric can indicate the metric based on which the request originator wants the request message to be routed by intermediate service layer entities. This parameter is optional, if it is left empty, then the default metric is 'Service Layer Hop'. Note, a registrar entity may indicate its preferred routing metric in the registration response message to its registree entity. The registree entity may use this a reference to configure the reqMetric.

resMetric can indicate the metric based on which the request originator wants the corresponding response message to be routed. This parameter is optional, if it is left empty, then the default metric is 'Service Layer Hop'.

On the other hand, the target service layer entity of the request message can also include a new parameter, called resMetric, which can indicate the metric based on which the response will be routed. This parameter is optional, if it is left empty, then the default metric is 'Service Layer Hop. The target service layer entity can set up this parameter in the response message based on the resMetric parameter in the request message. Or the target service layer may overwrite the original setting from the request originator, and set it up from its own knowledge and decision.

Figure 12:
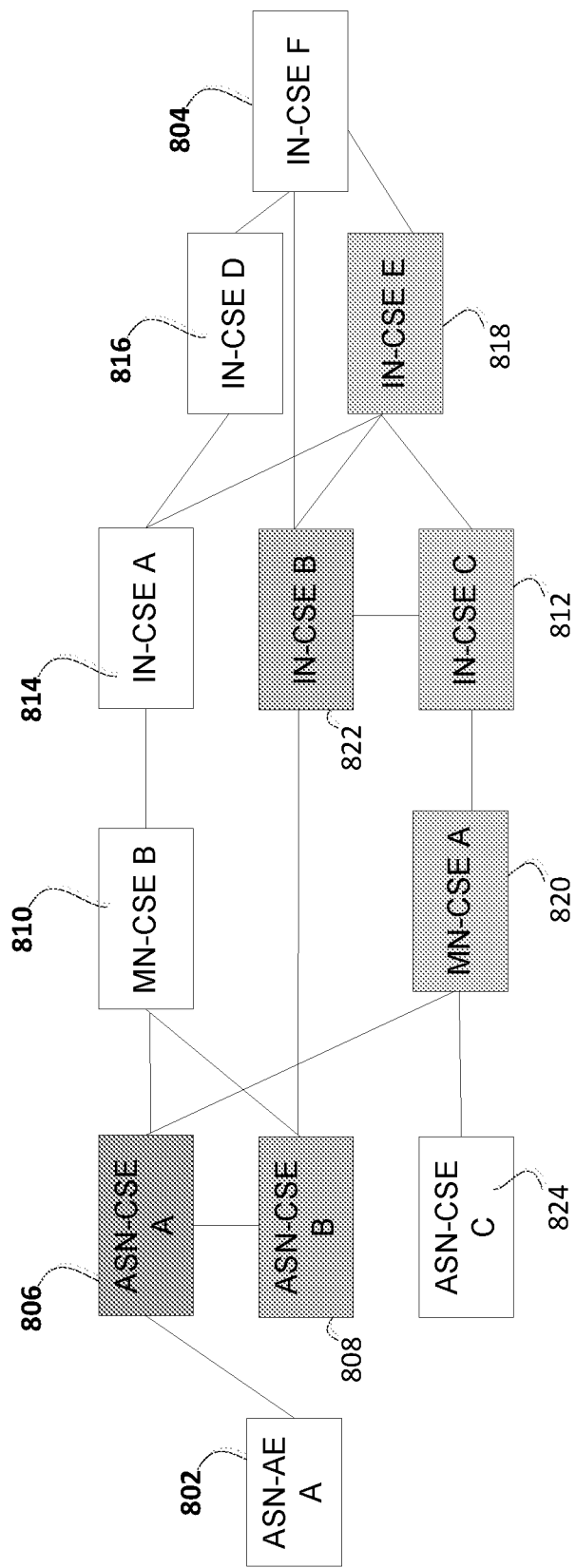
FIG. 12 is a diagram of Highlighted Routes for Request and Response Message.

In FIG. 12, ASN-AE A 802 sends a request message targeting IN-CSE F 804. In the request message, ASN-AE A 802 indicates that it wants the request service to be routed to IN-CSE F 804 with the metric of Service Layer Hop, thus the reqMetric parameter is set to 'Service Layer Hop'. It leaves the resMetric parameter to be empty. Note when a request or response message reaches a service layer entity, if the reqMetric or resMetric included in the request or response message is not supported currently by the service layer entity, then the service layer entity can be triggered to perform the measurement based on the metric and build the routing table. The service layer entity may keep the message in the queue until the routing table for the target is built based on the metric. In an alternative way, the service layer entity may return with an error (unsupported routing metric). After the routing table is built, the future service layer messages containing the same metric can be routed. In summary, in FIG. 12, the service layer entity AN CSE A 806 is the registrar CSE, i.e. the first CSE that receives the message. The service layer entities AN CSE B 808 and IN-CSE-B 822 are the intermediate nodes forwarding the request message based on 'Service Layer Hop', the service layer entities MN-CSE A 820, IN CSE C 812 and IN CSE E 818 are the intermediate nodes forwarding the response message based on the metric 'Network Layer Hop'.

It is understood that the functionality illustrated in FIG. 12 may be implemented in the form of software (i.e., computer-executable instructions) stored in a memory of, and executing on a processor of, a node of an M2M network (e.g., a server, gateway, device, or other computer system), such as one of those illustrated in FIG. 26C or 26D described below.

Figure 13:
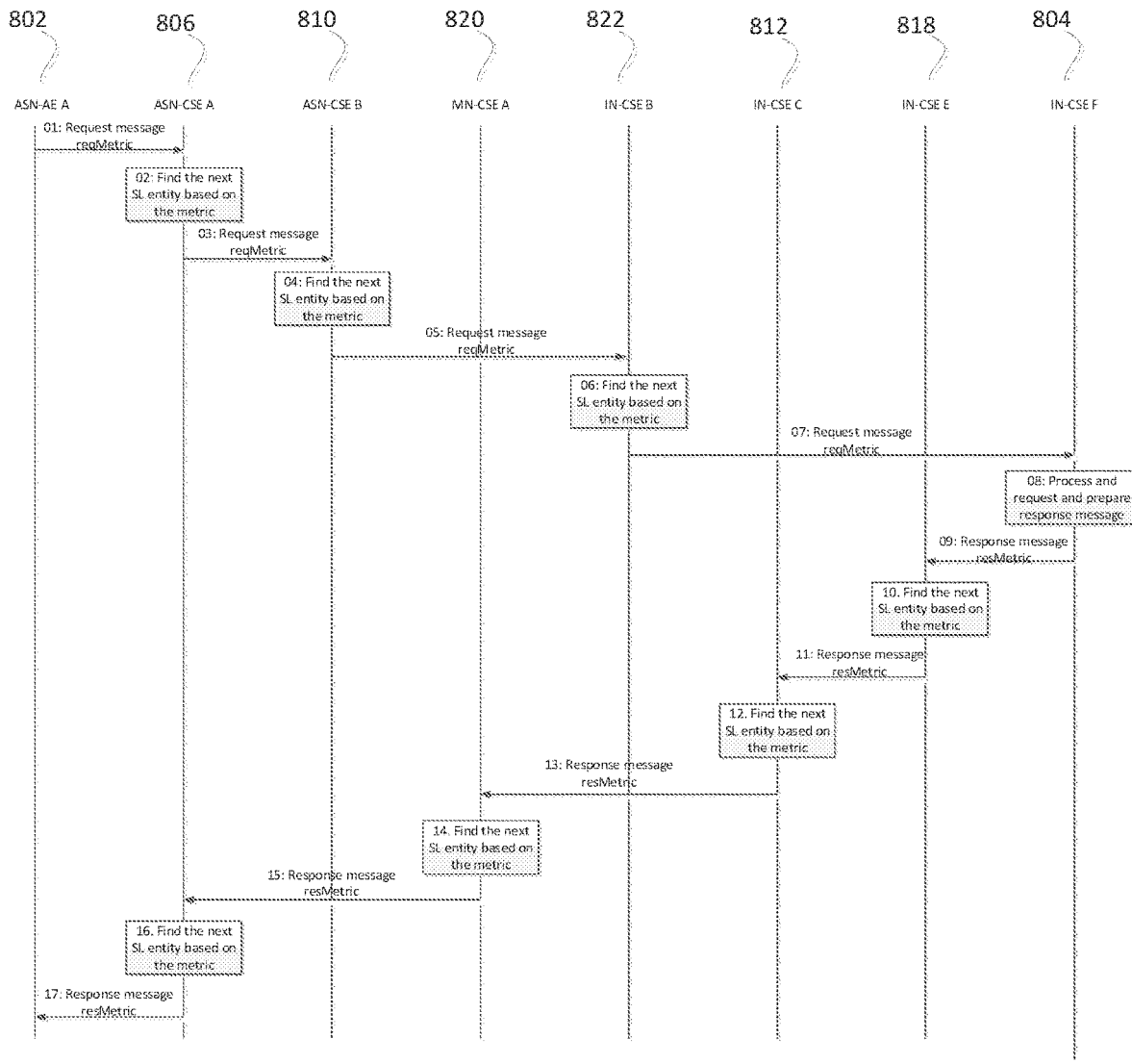
FIG. 13 is a diagram of Message Flow of Routing Service Layer Message.

FIG. 13 shows the message flow of the service layer routing of the request message and the corresponding response message:

In step 01 of FIG. 13, ASN-AE A 802 sends the request message targeting IN-CSE 802.

In step 02 of FIG. 13, ASN-CSE A 806 (it is the registrar CSE of ASN-AE A 802, which is colored in blue) receives the request message from ASN-AE A 802. ASN-CSE A 806 processes the request message, and finds it is not targeted for itself. Thus it checks the reqMetric parameter, and uses the routing table that is maintained for that metric. Based on the target in the request message, ASN-CSE A 806 finds the next service layer entity to forward the request message is ASN-CSE B 810.

In step 03 of FIG. 13, the request message is forwarded to ASN-CSE B 810 by ASN-CSE A 806.

In step 04 of FIG. 13, ASN-CSE B 810 receives the request message from ASN-CSE A 806. ASN-CSE B 810 processes the request message, and finds it is not targeted for itself. Thus it checks the reqMetric parameter, and uses the routing table that is maintained for that metric. Based on the target in the request message, ASN-CSE B 810 finds the next service layer entity to forward the request message is IN-CSE B 822.

In step 05 of FIG. 13, the request message is forwarded to IN-CSE B 822 by ASN-CSE B 808.

In step 06 of FIG. 13, IN-CSE B 822 receives the request message from ASN-CSE B 808. IN-CSE B 822 processes the request message, and finds it is not targeted for itself. Thus it checks the reqMetric parameter, and uses the routing table that is maintained for that metric. Based on the target in the request message, IN-CSE B 822 finds the next service layer entity to forward the request message is IN-CSE F 802.

In step 07 of FIG. 13, the request message is forwarded to IN-CSE F 804 by IN-CSE B 822.

In step 08 of FIG. 13, IN-CSE F 804 receives the request message from IN-CSE B 822. IN-CSE F 804 processes the request message, and finds it is targeted for itself. Thus it takes actions based on the request and prepare the response message. Because the resMetric parameter was left empty in the request message, IN-CSE F 804 may decide on the resMetric parameter to be put in the response. For example, IN-CSE F 804 sets the resMetric parameter to be 'Network Layer Hop'. Based on this metric and the target of the response message, IN-CSE F 804 finds the next service layer entity to send the response message is IN-CSE E 818.

In step 09 of FIG. 13, the response message is sent to IN-CSE E 818 from IN-CSE F 804.

In step 10 of FIG. 13, IN-CSE E 818 receives the response message from IN-CSE F 804. IN-CSE E 818 processes the response message, and finds it is not targeted for itself. Thus it checks the resMetric parameter, and uses the routing table that is maintained for that metric. Based on the target in the response message, IN-CSE E 818 finds the next service layer entity to forward the response message is IN-CSE C 812.

In step 11 of FIG. 13, the response message is forwarded to IN-CSE C 812 from IN-CSE E 818.

In step 12 of FIG. 13, IN-CSE C 812 receives the response message from IN-CSE E 818. IN-CSE C 812 processes the response message, and finds it is not targeted for itself. Thus it checks the resMetric parameter, and uses the routing table that is maintained for that metric. Based on the target in the response message, IN-CSE C 812 finds the next service layer entity to forward the response message is MN-CSE A 820.

In step 13 of FIG. 13, the response message is forwarded to MN-CSE A 820 from IN-CSE C 812.

In step 14 of FIG. 13, MN-CSE A 820 receives the response message from IN-CSE C 812. MN-CSE A 820 processes the response message, and finds it is not targeted for itself. Thus it checks the resMetric parameter, and uses the routing table that is maintained for that metric. Based on the target in the response message, MN-CSE A 802 finds the next service layer entity to forward the response message is ASN-CSE A 806.

In step 15 of FIG. 13, the response message is forwarded to ASN-CSE A 806 from IN-CSE-C 812.

In step 16 of FIG. 13, ASN-CSE A 806 receives the response message from MN-CSE C 812. ASN-CSE A 806 processes the response message, and finds it is not targeted for itself, but it is targeted for an AE that is registered by ASN-CSE A 806. Thus ASN-CSE A 806 simply forwards the response message to ASN-AE A 806.

In step 17 of FIG. 13, the response message is forwarded to ASN-AE A 802 from ASN-CSE A 806.

Figure 14:
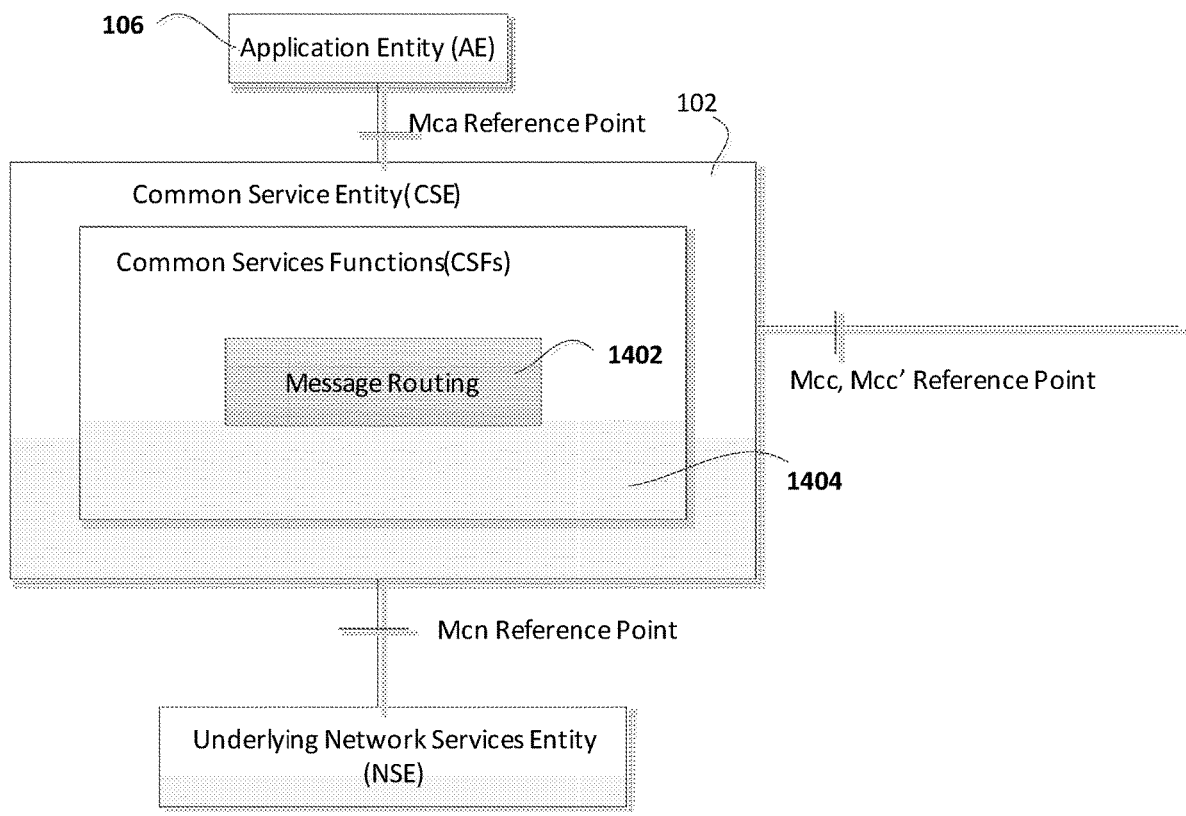
FIG. 14 is a diagram of a oneM2M Message Routing CSF Embodiment

It is understood that the entities performing the steps illustrated in FIG. 13 are logical entities that may be implemented in the form of software (i.e., computer-executable instructions) stored in a memory of, and executing on a processor of, a network node or computer system such as those illustrated in FIG. 26C or FIG. 26D. That is, the method(s) illustrated in FIG. 13 may be implemented in the form of software (i.e., computer-executable instructions) stored in a memory of a network node, such as the node or computer system illustrated in FIG. 26C or FIG. 26D, which computer executable instructions, when executed by a processor of the node, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

oneM2M ROA Embodiment of Message Routing Service oneM2M defines the capabilities supported by the oneM2M Service Layer. The oneM2M Service Layer is instantiated as a Capability Services Entity (CSE) 102 which comprises a set of Capability Service Functions (CSF) 1402. As one embodiment, the proposed Messaging Routing Service could be hosted in a CSE as a oneM2M CSF 1404 as shown in FIG. 14.

An AE or CSE will communicate with the Message Routing CSF 1404 via the Mca, Mcc and Mcc' reference point to build service layer routing table, i.e. request retrieval of or subscribe to other CSEs' routing tables. A CSE 102 will use the Message Routing CSF to forward service layer messages via the Mca, Mcc, and Mcc' reference point. The Message Routing CSF 1404 will communicate with the underlying network service entities via Mcn reference point to measure the weight to the service layer neighbors based on difference metrics.

Users could be in the form of an AE 106 to interface with the Message Routing Service for routing request message from the user and response message back to the user.

It is understood that the functionality illustrated in FIG. 14 may be implemented in the form of software (i.e., computer-executable instructions) stored in a memory of, and executing on a processor of, a node of an M2M network (e.g., a server, gateway, device, or other computer system), such as one of those illustrated in FIG. 26C or 26D described below.

New Request Parameter

It is proposed that the existing Request message is enhanced with a new parameter. Requests over the Mca and Mcc reference points, from an Originator to a Receiver can contain the new parameter, reqMetric, as an optional parameter. reqMetric is a metric based on which the request Originator wants the request message to be routed by Transit CSEs. This parameter is optional as shown in FIG. 14. If it is left empty, then the default metric could be 'Service Layer Hop'.

TABLE 18

New Parameter in Request Message

| Request message parameter\Operation | Create | Retrieve | Update | Delete | Notify |
|---|---|---|---|---|---|
| reqMetric—the metric used to route the request message | ○ | ○ | ○ | ○ | ○ |

New Procedure of Accessing Resources (Multiple Hops)

Figure 15:
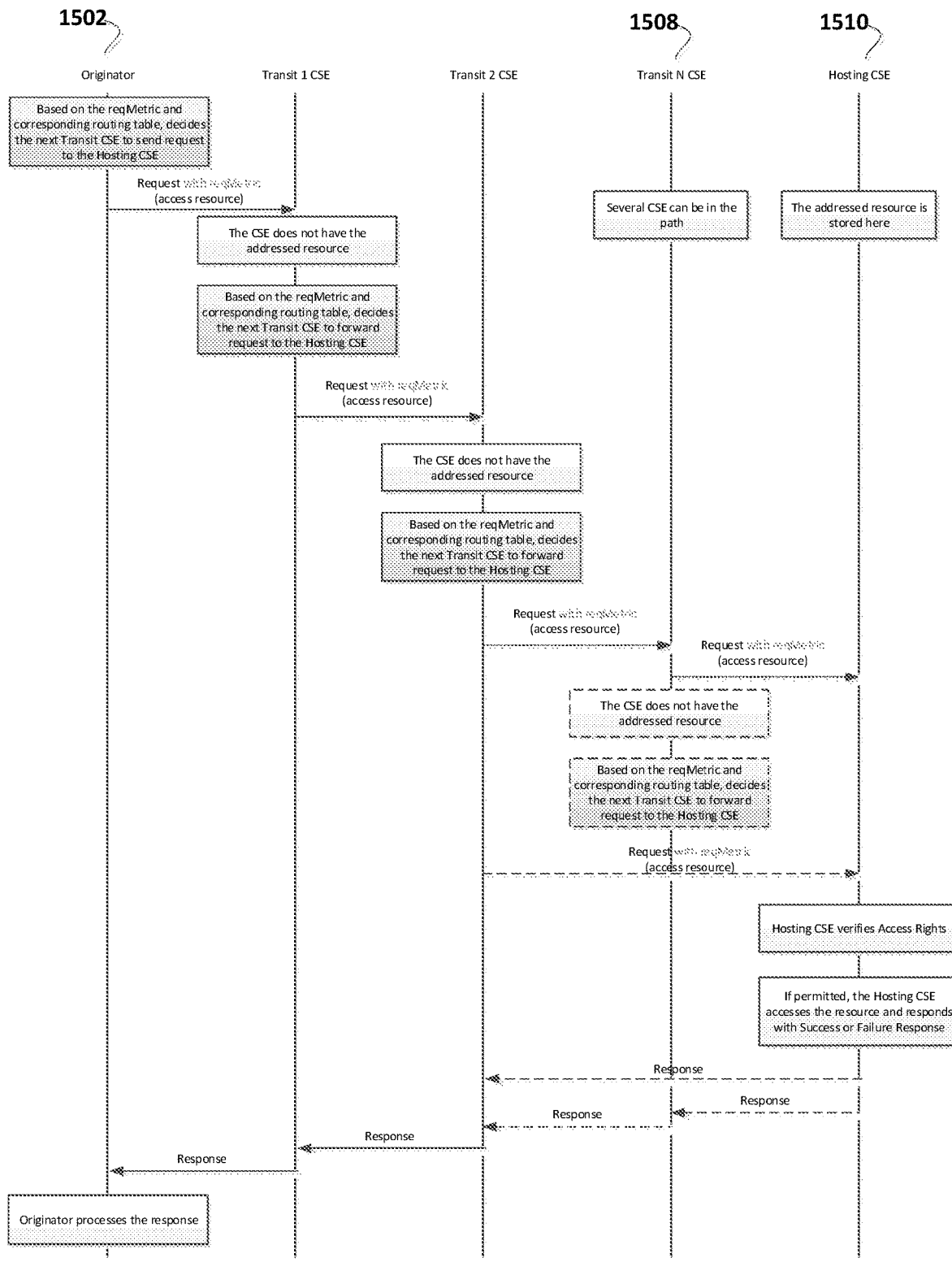
FIG. 15 is a diagram of a New Procedure of Originator accessing a resource at the Hosting CSE (Multiple Hops)

FIG. 15 shows the new procedure of an Originator accessing a resource at the Hosting CSE based on the proposed Message Routing Service, which is multiple hops away.

The Originator 1502 of the Request accesses a resource. The Originator 1502 of the Request may be an AE or a CSE.

Originator 1502:
Set up the reqMetric parameter in the Request.
Based on the reqMetric set up in the Request and corresponding routing table maintained locally, decides the next Transit CSE (e.g. Registrar CSE) to send in the Request towards to the Hosting CSE 1510.
Process the Response when it arrives.

Transit-N CSE 1508 receiving the Request:
Based on the reqMetric set up in the Request and corresponding routing table maintained locally, decides the next Transit CSE to forward the Request towards to the Hosting CSE.
In case the Request reaches the IN-CSE, the IN-CSE:
Performs the processing defined under 'Hosting CSE' below if the targeted resource is hosted on IN-CSE;
Based on the reqMetric set up in the Request and corresponding routing table maintained locally, decides another IN-CSE as the next CSE to forward the Request towards to the Hosting CSE.

Hosting CSE 1510:
Checks the Access Control Privileges for accessing the resource and depending on the expected result content respond with a success or failure Response.

Transit-N CSE 1508 receiving the Response:
Forward the Response towards to the Originator 1502.

It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 26C or FIG. 26D. That is, the method(s) illustrated in FIG. 15 may be implemented in the form of software (i.e., computer-executable instructions) stored in a memory of a network node, such as the node or computer system illustrated in FIG. 26C or FIG. 26D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

New Resources

Figure 16:
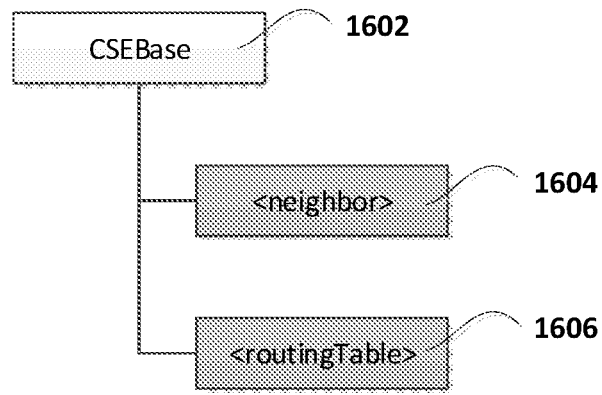
FIG. 16 is a diagram of a resource tree hierarchy of a oneM2M CSE.

In order to support the Message Routing Service proposed above, two new resources are proposed to add under <CSE-Base> 1602 as shown in FIG. 16. <neighbor> 1604, and <routingTable> 1606.

<Neighbor> Resource 1604

Figure 17:
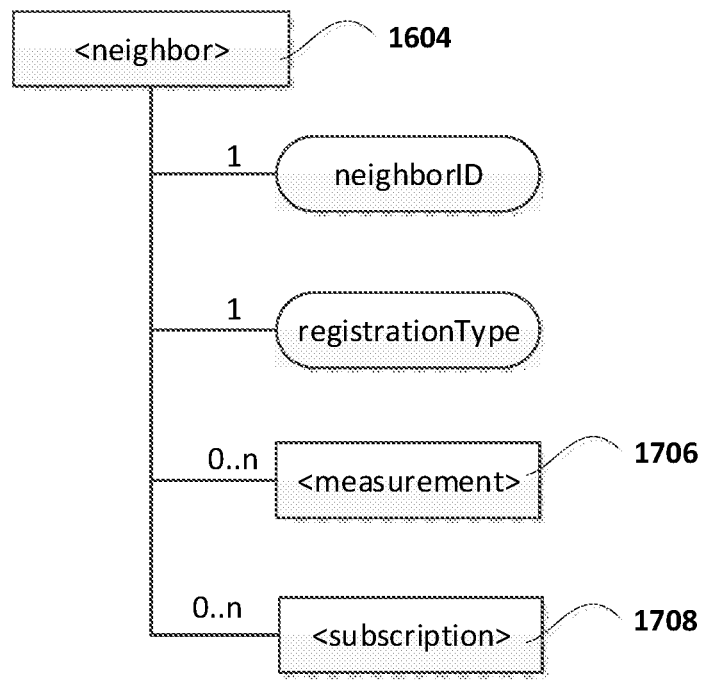
FIG. 17 is a diagram of a <neighbor> Resource.

The <neighbor> 1604 as shown in FIG. 17 stores the service layer neighbor's information and the measurement between the local CSE and the neighbor based on different metrics. It has a child resource <measurement> 1706 and the <subscription> 1708 child resource same as defined in the oneM2M Functional Architecture. Table 19 shows the attributes of the <neighbor> resource.

TABLE 19

Attribute of <neighbor>

| Attributes of <neighbor> | Multiplicity | RW/ RO/ WO | Description |
|---|---|---|---|
| neighborID | 1 | WO | The address of the neighbor resource represented by this <neighbor> resource. |
| registrationType | 1 | WO | Indicates the registration type between the local CSE and the neighbor: 1—full registrar 2—full registree 3—SL entity providing Message Routing Service due to flexible service request 4—SL entity providing Message Routing Service due to pre-configured policies. |

<Measurement> Resource

Figure 18:
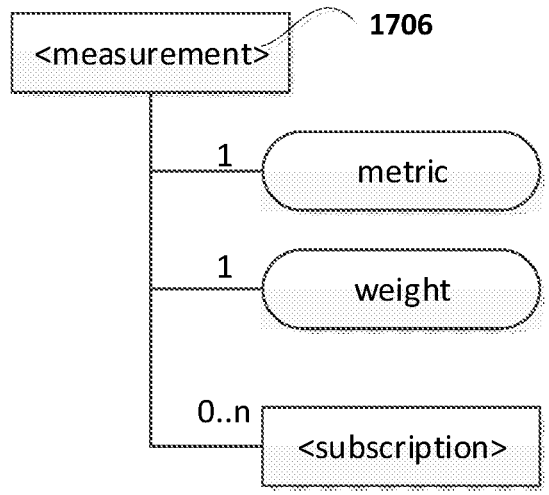
FIG. 18 is a diagram of a <measurement> Resource

FIG. 18 shows the child resource <measurement>, Table 20 shows the attribute of the <measurement> child resource. The <measurement> resource has the <subscription> child resource as defined in the oneM2M Functional Architecture.

TABLE 20

Attribute of <measurement>

| Attributes of <measurement> | Multiplicity | RW/ RO/ WO | Description |
|---|---|---|---|
| metric | 1 | WO | Indicates the metric is used to do the measurement between the local CSE and the neighbor. |
| weight | 1 | WO | Indicates the weight between the local CSE and the neighbor based on the metric |

<routingTable> Resource 1902

Figure 19:
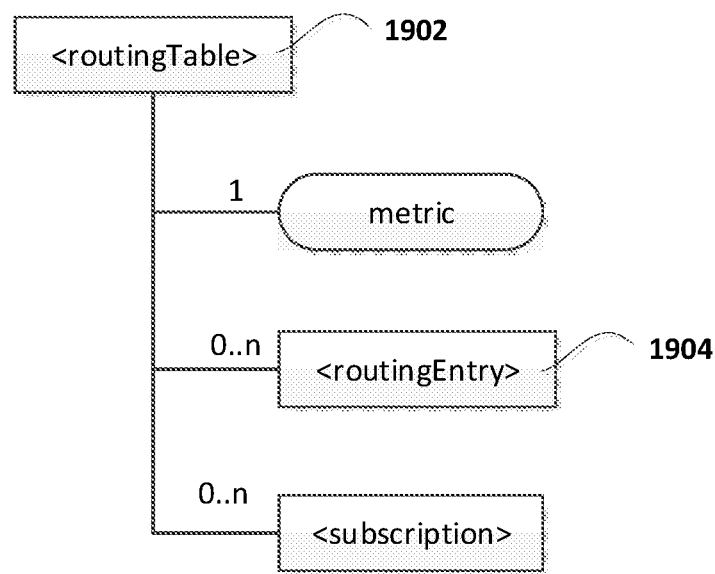
FIG. 19 is a diagram of a <routingTable> Resource.

The <routingTable> 1902 as shown in FIG. 19 stores the service layer routing tables based on different metrics. It has a child resource <routingEntry> 1904 and the <subscription> child resource as defined in the oneM2M Functional Architecture. Table 22 shows the attributes of the <routingTable> resource 1902.

TABLE 21

Attribute of <routingTable>

| Attribute of <routing> | Multiplicity | RW/ RO/ WO | Description |
|---|---|---|---|
| metric | 1 | WO | Indicates the metric that is based on to build the routing entries. |

<routingEntry> Resource 1904

Figure 20:
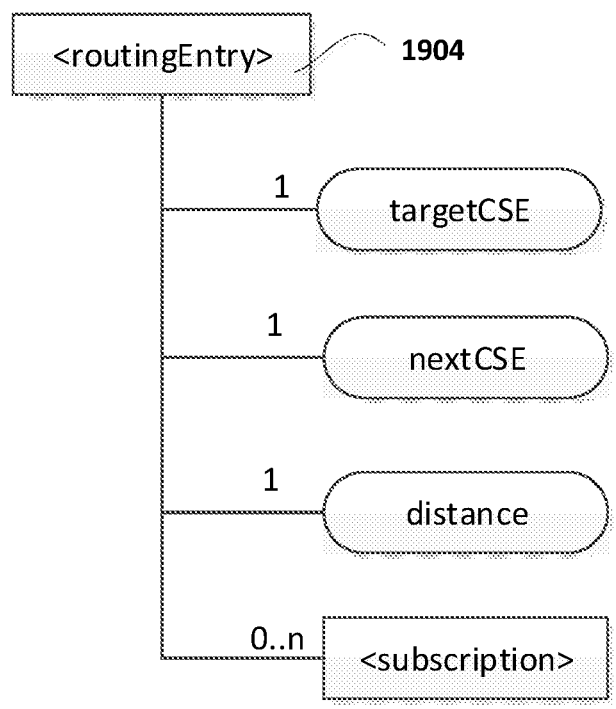
FIG. 20 is a diagram of a <routingEntry> Resource.

FIG. 20 shows the child resource <routingEntry> 1904. Table 22 shows the attribute of the <routingEntry> child resource 1904. The <routingEntry> resource 1904 has the <subscription> child resource as defined in the oneM2M Functional Architecture.

TABLE 22

Attribute of <routingEntry>

| Attributes of <routingEntry> | Multiplicity | RW/ RO/ WO | Description |
|---|---|---|---|
| target | 1 | WO | Indicates the target AE or CSE that is routing entry is about. |
| nextCSE | 1 | RW | Indicates the next CSE that service layer messages should be forwarded towards the target CSE. |
| total weight | 1 | RW | Indicates the total weight between the local CSE and the target CSE. |

New Resource Procedures
Procedures for <Neighbor> Resource
Create <Neighbor>

This procedure shown in Table 23 is used to create a specific <neighbor> resource in the hosting CSE.

TABLE 23

| | <neighbor> CREATE |
|---|---|
| | <neighbor> CREATE |
| Associated Reference Point | Mcc, Mca and Mcc' |
| Information in Request message | All parameters defined in table 8.1.2.1-1 in the oneM2M Functional Architecture apply with the specific details for: Content: The resource content shall provide the information as defined above. |

TABLE 23-continued

| | <neighbor> CREATE |
|---|---|
| | <neighbor> CREATE |
| Processing at Originator before sending Request | According to clause 10.1.1.1 in the oneM2M Functional Architecture. |
| Processing at Receiver | According to clause 10.1.1.1 in the oneM2M Functional Architecture. |
| Information in Response message | All parameters defined in table 8.1.2.1-1 in the oneM2M Functional Architecture apply with the specific details for: Content: Address of the created <neighbor> resource, according to clause 10.1.1.1 in the oneM2M Functional Architecture. |
| Processing at Originator after receiving Response | According to clause 10.1.1.1 in the oneM2M Functional Architecture. |
| Exceptions | According to clause 10.1.1.1 in the oneM2M Functional Architecture. |

Retrieve <Neighbor>

This procedure shown in Table 24 used for retrieving the representation of a <neighbor> resource.

TABLE 24

| | <neighbor> RETRIEVE |
|---|---|
| | <neighbor> RETRIEVE |
| Associated Reference Point | Mca, Mcc and Mcc' |
| Information in Request message | All parameters defined in table 8.1.2.1-1 in the oneM2M Functional Architecture apply with the specific details for: Content: void |
| Processing at Originator before sending Request | According to clause 10.1.2 in the oneM2M Functional Architecture. |
| Processing at Receiver | According to clause 10.1.2 in the oneM2M Functional Architecture. |
| Information in Response message | All parameters defined in table 8.1.2.1-1 in the oneM2M Functional Architecture apply with the specific details for: Content: attributes of the <neighbor> resource as defined above. |
| Processing at Originator after receiving Response | According to clause 10.1.2 in the oneM2M Functional Architecture. |
| Exceptions | According to clause 10.1.2 in the oneM2M Functional Architecture. |

Update <Neighbor>

This procedure shown in Table 25 is used for updating the attributes of a <neighbor> resource.

TABLE 25

| | <neighbor> UPDATE |
|---|---|
| | <container> UPDATE |
| Associated Reference Point | Mca, Mcc and Mcc' |
| Information in Request message | All parameters defined in table 8.1.2.1-1 in the oneM2M Functional Architecture apply with the specific details for: Content: attributes of the <neighbor> resource as defined above which need be updated. |
| Processing at Originator before sending Request | According to clause 10.1.3 in the oneM2M Functional Architecture. |
| Processing at Receiver | According to clause 10.1.3 in the oneM2M Functional Architecture. |
| Information in Response message | According to clause 10.1.3 in the oneM2M Functional Architecture. |

TABLE 25-continued

| | |
|---|---|
| | <neighbor> UPDATE |
| | <container> UPDATE |
| Processing at Originator after receiving Response | According to clause 10.1.3 in the oneM2M Functional Architecture. |
| Exceptions | According to clause 10.1.3 in the oneM2M Functional Architecture. |

Delete <Neighbor>

This procedure shown in Table 26 is used for deleting a <neighbor> resource.

TABLE 26

| | |
|---|---|
| | <neighbor> DELETE |
| | <neighbor> DELETE |
| Associated Reference Point | Mca, Mcc and Mcc' |
| Information in Request message | All parameters defined in table 8.1.2.1-1 in the oneM2M Functional Architecture apply. |
| Processing at Originator before sending Request | According to clause 10.1.4 in the oneM2M Functional Architecture. |
| Processing at Receiver | According to clause 10.1.4 in the oneM2M Functional Architecture. |
| Information in Response message | According to clause 10.1.4 in the oneM2M Functional Architecture. |
| Processing at Originator after receiving Response | According to clause 10.1.4 in the oneM2M Functional Architecture. |
| Exceptions | According to clause 10.1.4 in the oneM2M Functional Architecture. |

Procedures for <Measurement> Resource

Create <Measurement>

This procedure shown in Table 27 is used to create a specific <measurement> resource in the hosting CSE.

TABLE 27

| | |
|---|---|
| | <measurement> CREATE |
| | <measurement> CREATE |
| Associated Reference Point | Mcc, Mca and Mcc' |
| Information in Request message | All parameters defined in table 8.1.2.1-1 in the oneM2M Functional Architecture apply with the specific details for: Content: The resource content shall provide the information as defined in Section 1.3.1.1.1. |
| Processing at Originator before sending Request | According to clause 10.1.1.1 in the oneM2M Functional Architecture. |
| Processing at Receiver | According to clause 10.1.1.1 in the oneM2M Functional Architecture. |
| Information in Response message | All parameters defined in table 8.1.2.1-1 in the oneM2M Functional Architecture apply with the specific details for: Content: Address of the created <measurement> resource, according to clause 10.1.1.1 in the oneM2M Functional Architecture. |
| Processing at Originator after receiving Response | According to clause 10.1.1.1 in the oneM2M Functional Architecture. |
| Exceptions | According to clause 10.1.1.1 in the oneM2M Functional Architecture. |

Retrieve <Measurement>

This procedure shown in Table 28 is used for retrieving the representation of a <measurement> resource.

TABLE 28

| | |
|---|---|
| | <measurement> RETRIEVE |
| | <measurement> RETRIEVE |
| Associated Reference Point | Mca, Mcc and Mcc' |
| Information in Request message | All parameters defined in table 8.1.2.1-1 in the oneM2M Functional Architecture apply with the specific details for: Content: void |
| Processing at Originator before sending Request | According to clause 10.1.2 in the oneM2M Functional Architecture. |
| Processing at Receiver | According to clause 10.1.2 in the oneM2M Functional Architecture. |
| Information in Response message | All parameters defined in table 8.1.2.1-1 in the oneM2M Functional Architecture apply with the specific details for: Content: attributes of the <measurement> resource as defined in Section 1.3.1.1.1. |
| Processing at Originator after receiving Response | According to clause 10.1.2 in the oneM2M Functional Architecture. |
| Exceptions | According to clause 10.1.2 in the oneM2M Functional Architecture. |

Update <Measurement>

This procedure shown in Table 29 is used for updating the attributes of a <measurement> resource.

TABLE 29

| | |
|---|---|
| | <measurement> UPDATE |
| | <measurement> UPDATE |
| Associated Reference Point | Mca, Mcc and Mcc' |
| Information in Request message | All parameters defined in table 8.1.2.1-1 in the oneM2M Functional Architecture apply with the specific details for: Content: attributes of the <measurement> resource as defined in Section 1.3.1.1.1 which need be updated. |
| Processing at Originator before sending Request | According to clause 10.1.3 in the one M2M Functional Architecture. |
| Processing at Receiver | According to clause 10.1.3 in the oneM2M Functional Architecture. |
| Information in Response message | According to clause 10.1.3 in the oneM2M Functional Architecture. |
| Processing at Originator after receiving Response | According to clause 10.1.3 in the oneM2M Functional Architecture. |
| Exceptions | According to clause 10.1.3 in the oneM2M Functional Architecture. |

Delete <Measurement>

This procedure shown in Table 30 is used for deleting a <measurement> resource.

TABLE 30

| | |
|---|---|
| | <measurement> DELETE |
| | <measurement> DELETE |
| Associated Reference Point | Mca, Mcc and Mcc' |
| Information in Request message | All parameters defined in table 8.1.2.1-1 in the oneM2M Functional Architecture apply. |
| Processing at Originator before sending Request | According to clause 10.1.4 in the oneM2M Functional Architecture. |
| Processing at Receiver | According to clause 10.1.4 in the oneM2M Functional Architecture. |
| Information in Response message | According to clause 10.1.4 in the oneM2M Functional Architecture. |

Procedures for <routingTable> Resource

Create <routingTable>

This procedure shown in Table 31 is used to create a specific <routingTable> resource in the hosting CSE.

TABLE 31

| | |
|---|---|
| <routingTable> CREATE | |
| <routingTable> CREATE | |
| Associated Reference Point | Mcc, Mca and Mcc' |
| Information in Request message | All parameters defined in table 8.1.2.1-1 in the oneM2M Functional Architecture with the specific details for: Content: The resource content shall provide the information as defined in above. |
| Processing at Originator before sending Request | According to clause 10.1.1.1 in the oneM2M Functional Architecture. |
| Processing at Receiver | According to clause 10.1.1.1 in the oneM2M Functional Architecture. |
| Information in Response message | All parameters defined in table 8.1.2.1-1 in the oneM2M Functional Architecture apply with the specific details for: Content: Address of the created <routingTable> resource, according to clause 10.1.1.1 in the oneM2M Functional Architecture. |
| Processing at Originator after receiving Response | According to clause 10.1.1.1 in the oneM2M Functional Architecture. |
| Exceptions | According to clause 10.1.1.1 in the oneM2M Functional Architecture. |

Retrieve <routingTable>

This procedure shown in Table 32 is used for retrieving the representation of a <routingTable> resource.

TABLE 32

| | |
|---|---|
| <routingTable> RETRIEVE | |
| <routingTable> RETRIEVE | |
| Associated Reference Point | Mca, Mcc and Mcc' |
| Information in Request message | All parameters defined in table 8.1.2.1-1 in the oneM2M Functional Architecture apply with the specific details for: Content: void |
| Processing at Originator before sending Request | According to clause 10.1.2 in the oneM2M Functional Architecture. |
| Processing at Receiver | According to clause 10.1.2 in the oneM2M Functional Architecture. |
| Information in Response message | All parameters defined in table 8.1.2.1-1 in the oneM2M Functional Architecture apply with the specific details for: Content: attributes of the <routingTable> resource as defined in above. |
| Processing at Originator after receiving Response | According to clause 10.1.2 in the oneM2M Functional Architecture. |
| Exceptions | According to clause 10.1.2 in the oneM2M Functional Architecture. |

Update <routingTable>

This procedure shown in Table 33 is used for updating the attributes of a <routingTable> resource.

TABLE 33

| | |
|---|---|
| <routingTable> UPDATE | |
| <routingTable> UPDATE | |
| Associated Reference Point | Mca, Mcc and Mcc' |
| Information in Request message | All parameters defined in table 8.1.2.1-1 in the oneM2M Functional Architecture apply with the specific details for: Content: attributes of the <routingTable> resource as defined in above which need be updated. |
| Processing at Originator before sending Request | According to clause 10.1.3 in the oneM2M Functional Architecture. |
| Processing at Receiver | According to clause 10.1.3 in the oneM2M Functional Architecture. |
| Information in Response message | According to clause 10.1.3 in the oneM2M Functional Architecture. |
| Processing at Originator after receiving Response | According to clause 10.1.3 in the oneM2M Functional Architecture. |
| Exceptions | According to clause 10.1.3 in the oneM2M Functional Architecture. |

Delete <routingTable>

This procedure shown in Table 34 is used for deleting a <routingTable> resource.

TABLE 34

| | |
|---|---|
| <routingTable> DELETE | |
| <routingTable> DELETE | |
| Associated Reference Point | Mca, Mcc and Mcc' |
| Information in Request message | All parameters defined in table 8.1.2.1-1 in the oneM2M Functional Architecture apply. |
| Processing at Originator before sending Request | According to clause 10.1.4 in the oneM2M Functional Architecture. |
| Processing at Receiver | According to clause 10.1.4 in the oneM2M Functional Architecture. |
| Information in Response message | According to clause 10.1.4 in the oneM2M Functional Architecture. |
| Processing at Originator after receiving Response | According to clause 10.1.4 in the oneM2M Functional Architecture. |
| Exceptions | According to clause 10.1.4 in the oneM2M Functional Architecture. |

Procedures for <routingEntry> Resource

Create <routingEntry>

This procedure shown in Table 35 is used to create a specific <routingEntry> resource in the hosting CSE.

TABLE 35

| | |
|---|---|
| <routingEntry> CREATE | |
| <routingEntry> CREATE | |
| Associated Reference Point | Mcc, Mca and Mcc' |
| Information in Request message | All parameters defined in table 8.1.2.1-1 in the oneM2M Functional Architecture apply with the specific details for: Content: The resource content shall provide the information as defined in above. |
| Processing at Originator before sending Request | According to clause 10.1.1.1 in the oneM2M Functional Architecture. |
| Processing at Receiver | According to clause 10.1.1.1 in the oneM2M Functional Architecture. |
| Information in Response message | All parameters defined in table 8.1.2.1-1 in the oneM2M Functional Architecture apply with the specific details for: Content: Address of the created <routingEntry> resource, according to clause 10.1.1.1 in the oneM2M Functional Architecture. |

(TABLE 30-continued)

| | |
|---|---|
| <measurement> DELETE | |
| <measurement> DELETE | |
| Processing at Originator after receiving Response | According to clause 10.1.4 in the oneM2M Functional Architecture. |
| Exceptions | According to clause 10.1.4 in the oneM2M Functional Architecture. |

Procedures for <routingTable> Resource

Create <routingTable>

This procedure shown in Table 31 is used to create a specific <routingTable> resource in the hosting CSE.

TABLE 35-continued

| <routingEntry> CREATE | |
| --- | --- |
| <routingEntry> CREATE | |
| Processing at Originator after receiving Response | According to clause 10.1.1.1 in the oneM2M Functional Architecture. |
| Exceptions | According to clause 10.1.1.1 in the oneM2M Functional Architecture. |

Retrieve <routingEntry>

This procedure shown in Table 37 is used for retrieving the representation of a <routingEntry> resource.

TABLE 36

| <routingEntry> RETRIEVE | |
| --- | --- |
| <routingEntry> RETRIEVE | |
| Associated Reference Point | Mca, Mcc and Mcc' |
| Information in Request message | All parameters defined in table 8.1.2.1-1 in the oneM2M Functional Architecture apply with the specific details for: Content: void |
| Processing at Originator before sending Request | According to clause 10.1.2 in the oneM2M Functional Architecture. |
| Processing at Receiver | According to clause 10.1.2 in the oneM2M Functional Architecture. |
| Information in Response message | All parameters defined in table 8.1.2.1-1 in the oneM2M Functional Architecture apply with the specific details for: Content: attributes of the <routingEntry> resource as defined in above |
| Processing at Originator after receiving Response | According to clause 10.1.2 in the oneM2M Functional Architecture. |
| Exceptions | According to clause 10.1.2 in the oneM2M Functional Architecture. |

Update <routingEntry>

This procedure shown in Table 37 is used for updating the attributes of a <routingEntry> resource.

TABLE 37

| <routingEntry> UPDATE | |
| --- | --- |
| <routingEntry> UPDATE | |
| Associated Reference Point | Mca, Mcc and Mcc' |
| Information in Request message | All parameters defined in table 8.1.2.1-1 in the oneM2M Functional Architecture apply with the specific details for: Content: attributes of the <routingEntry> resource as defined in above which need be updated. |
| Processing at Originator before sending Request | According to clause 10.1.3 in the oneM2M Functional Architecture. |
| Processing at Receiver | According to clause 10.1.3 in the oneM2M Functional Architecture. |
| Information in Response message | According to clause 10.1.3 in the oneM2M Functional Architecture. |
| Processing at Originator after receiving Response | According to clause 10.1.3 in the oneM2M Functional Architecture. |
| Exceptions | According to clause 10.1.3 in the oneM2M Functional Architecture. |

Delete <routingEntry>

This procedure shown in Table 38 is used for deleting a <routingEntry> resource.

TABLE 38

| <routingEntry> DELETE | |
| --- | --- |
| <routingEntry> DELETE | |
| Associated Reference Point | Mca, Mcc and Mcc' |
| Information in Request message | All parameters defined in table 8.1.2.1-1 in the oneM2M Functional Architecture apply. |
| Processing at Originator before sending Request | According to clause 10.1.4 in the oneM2M Functional Architecture. |
| Processing at Receiver | According to clause 10.1.4 in the oneM2M Functional Architecture. |
| Information in Response message | According to clause 10.1.4 in the oneM2M Functional Architecture. |
| Processing at Originator after receiving Response | According to clause 10.1.4 in the oneM2M Functional Architecture. |
| Exceptions | According to clause 10.1.4 in the oneM2M Functional Architecture. | oneM2M SOA Embodiment of Messaging Routing Service

Figure 21:
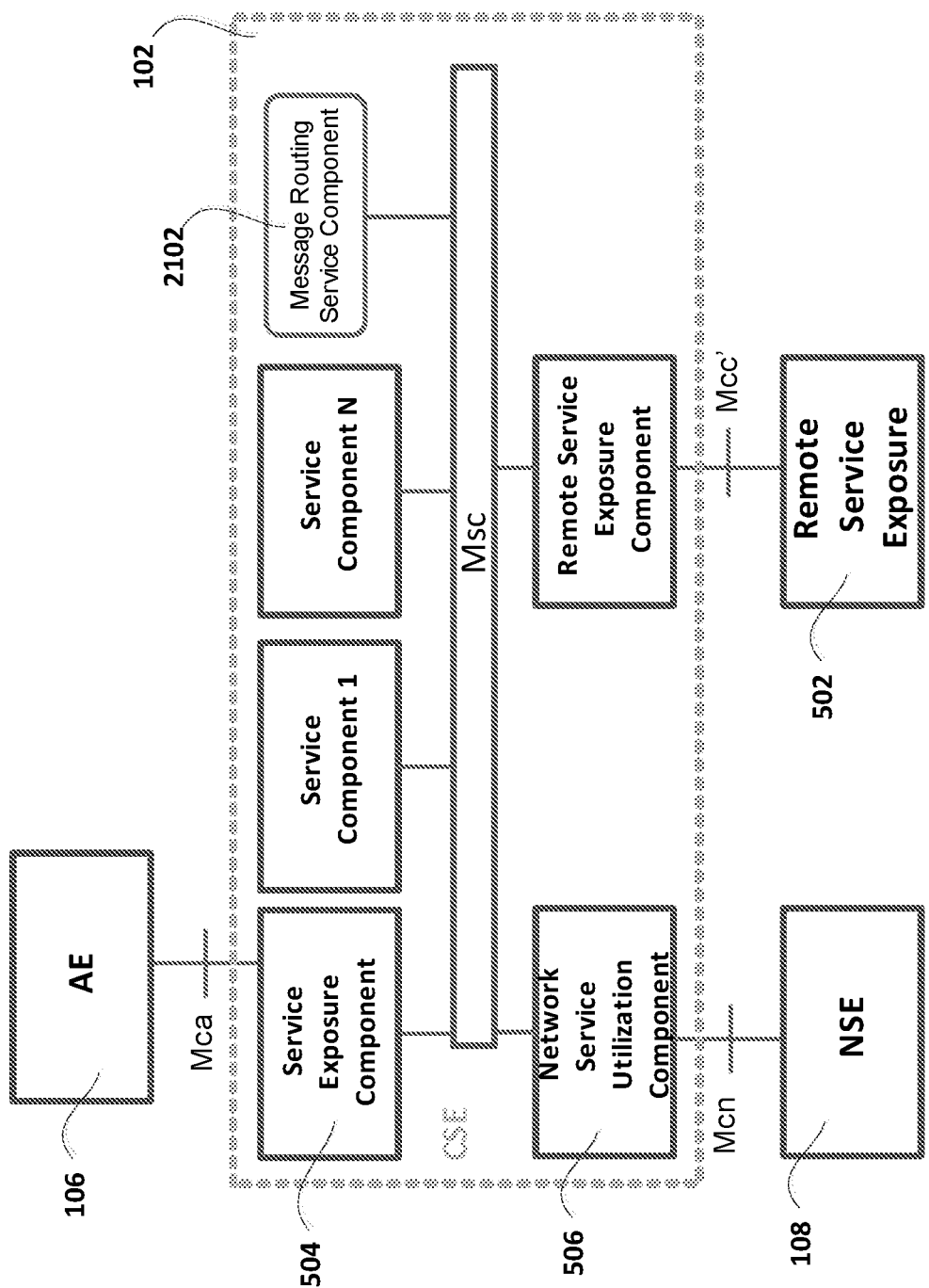
FIG. 21 is a diagram of oneM2M Message Routing Service Component Embodiment

FIG. 21 also shows implementation architecture of Message Routing Service in the oneM2M Service Component Architecture the oneM2M Functional Architecture. A service layer message originator in the forms of such as AE 106 or CSE 102 will talk to the Message Routing Service Component 2102 via the Mca or Msc reference point to build service layer routing table, i.e. request retrieval of or subscribe to other CSEs' routing tables. The Message Routing Service Component 2102 will communicate with the underlying network service entities via Msc reference point through Network Service Utilization Component 506 to measure the weight to the service layer neighbors based on difference metrics.

It is understood that the functionality illustrated in FIG. 21 may be implemented in the form of software (i.e., computer-executable instructions) stored in a memory of, and executing on a processor of, a node of an M2M network (e.g., a server, gateway, device, or other computer system), such as one of those illustrated in FIG. 26C or 26D described below.

Service Capabilities getSLNeighborWeight

This service capability provides the capability to get the weight on the service layer link between service layer neighbors based on different metrics.

Pre-Conditions

The Originator can be an AE or CSE, and the Originator wants to get the weight between itself and its neighbors.

Signature—getSLNeighborWeight

| Parameter name | Direction | Optional | Description |
| --- | --- | --- | --- |
| metric | IN | NO | The metric that is used to do the measurement. |
| weight | OUT | NO | Based on the metric, the receiving service capability calculates the weight if the weight is not available or returns the weight if the weight is available. |

Service Interactions

The interactions of service capabilities required for this service capability:

1. Issue the request to the Message Routing Service Component to perform the operation as shown in FIG. 22

Figure 22:
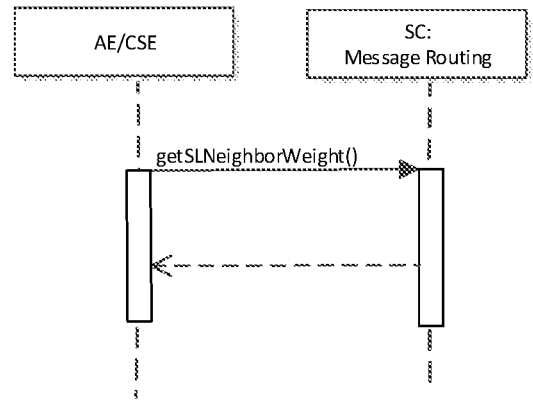
FIG. 22-24 are diagrams of requests to the Message Routing Service Component.

FIG. 22 is a diagram of a request to the Message Routing Service Component.
Post-Conditions
Not Applicable.
Exceptions
The Originator has no access right to retrieve the weight.
Polices for Use
Message Exchange Patterns: In-Out
Transaction Pattern: Participation allowed
oneM2M Resource Interworking This service capability is used to get the weight on the service layer link to a service layer neighbor. The service capability aligns with the <measurement> resource and maps to the Retrieve procedure for the resource.
getSLRoutingTable This service capability provides the capability to get the service layer routing table from a service layer neighbor.
Pre-Conditions The Originator can be an AE or CSE, and the Originator wants to get the routing table based on a metric from a service layer neighbor.
Signature—getSLRoutingTable

| Parameter name | Direction | Optional | Description |
| --- | --- | --- | --- |
| metric | IN | Yes | The metric that was used to build the routing table. |
| routingTable | OUT | NO | The receiving service capability returns all of its maintained routing table(s) or a particular routing table, based on the metric is included in the IN parameter or not. |

Service Interactions
The interactions of service capabilities required for this service capability:
 1. Issue the request to the Message Routing Service Component to perform the operation as shown in FIG. 23

Figure 23:
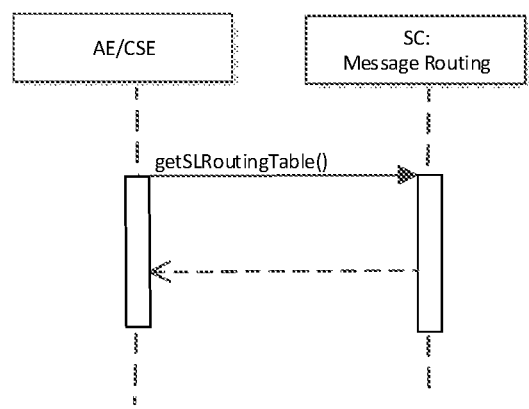

FIG. 23 is a diagram of issuing the request to the Message Routing Service Component
Post-Conditions
Not Applicable.
Exceptions
The Originator has no access right to retrieve the routing table(s).
Polices for Use
Message Exchange Patterns: In-Out
Transaction Pattern: Participation allowed
oneM2M Resource Interworking This service capability is used to get the routing table(s) of a service layer neighbor. The service capability aligns with the <routingTable> resource and maps to the Retrieve procedure for the resource.
routeSLMessage This service capability provides the capability to route a service layer message to the next CSE towards the Receiver based on the maintained routing table.
Pre-Conditions The Originator can be an AE or CSE, and the Originator wants to a service layer message to be routed or forwarded towards the Receiver.
Signature—routeSLMessage

| Parameter name | Direction | Optional | Description |
| --- | --- | --- | --- |
| request or response message | IN | NO | The request or response message to be routed. |
| Request reference | OUT | Yes | The receiving service capability returns the request reference to the Originator where the request status can be retrieved later. |

Figure 24:
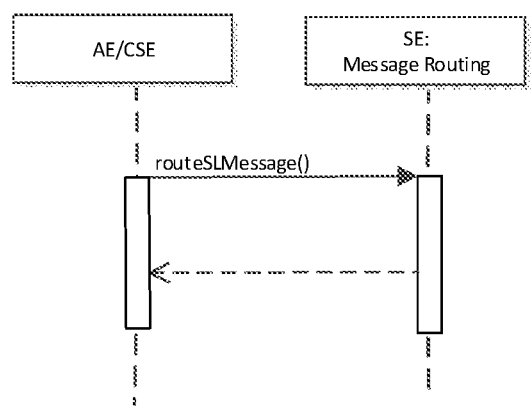

Service Interactions
The interactions of service capabilities required for this service capability include issuing the request to the Message Routing Service Component to perform the operation as shown in FIG. 24.
Post-Conditions
Not Applicable.
Exceptions
The Originator has no access right to use the routing tables.
Polices for Use
Message Exchange Patterns: In-Out
Transaction Pattern: Participation allowed
oneM2M Resource Interworking This service capability is used to perform service layer routing. The service capability aligns with the <routingTable> resource and maps to the Execute procedure for the resource.

It is understood that the entities performing the steps illustrated in FIGS. 22-24 are logical entities that may be implemented in the form of software (i.e., computer-executable instructions) stored in a memory of, and executing on a processor of, a network node or computer system such as those illustrated in FIG. 26C or FIG. 26D. That is, the method(s) illustrated in FIGS. 22-24 may be implemented in the form of software (i.e., computer-executable instructions) stored in a memory of a network node, such as the node or computer system illustrated in FIG. 26C or FIG. 26D, which computer executable instructions, when executed by a processor of the node, perform the steps illustrated in FIGS. 22-24. It is also understood that any transmitting and receiving steps illustrated in FIGS. 22-24 may be performed by communication circuitry of the node under control of the processor of the node and the computer-executable instructions (e.g., software) that it executes.

Figure 25A:
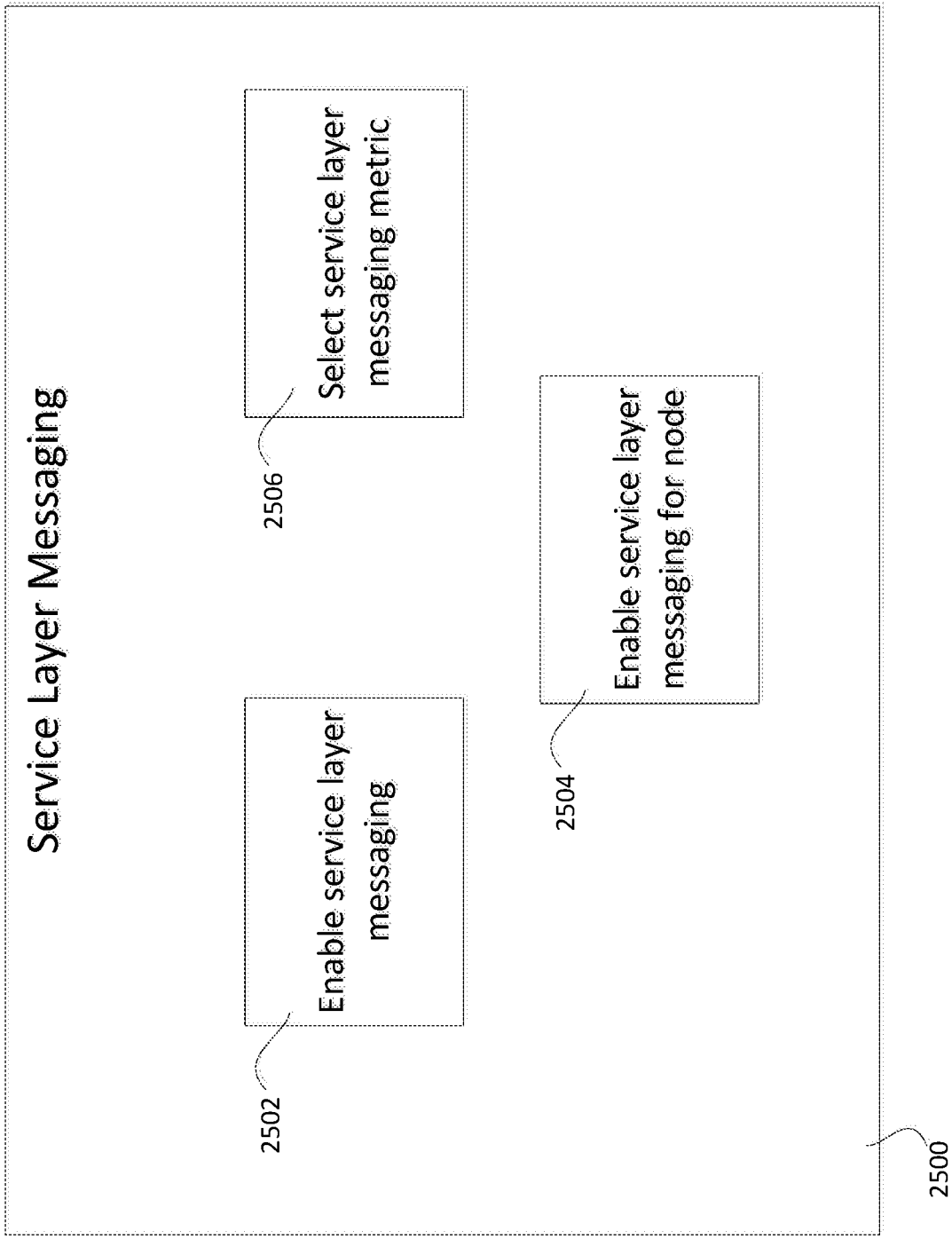
FIGS. 25A-B are diagrams that illustrates a graphical user interfaces related to service layer messaging.

Interfaces, such as Graphical User Interfaces (GUIs), can be used to assist user to control and/or configure functionalities related to the service layer messaging. FIG. 25A is a diagram that illustrates an interface 2500 that allows a user to enable service layer messaging 2502, enable service layer messaging for a node 2504 and select the service layer messaging metric 2506.

Figure 25B:
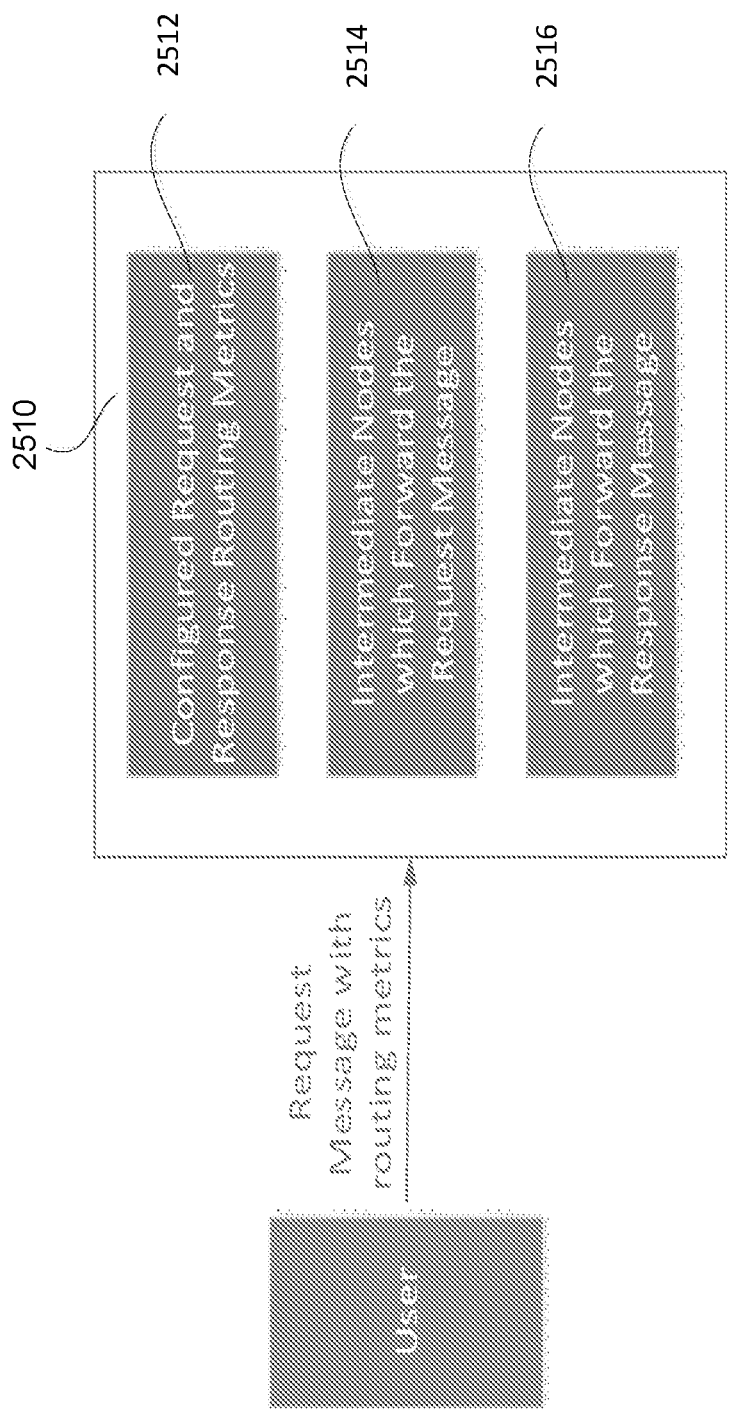

FIG. 25B shows an alternate user interface 2510. User interface 2510 can be located at a hosting node (e.g. an M2M Gateway, an M2M Server) to display information related to message routing including:
 The request and response message routing metrics configured by the user 2512.
 The intermediate Service Layer nodes that route the request message based on their local routing tables 2514.
 The intermediate Service Layer nodes that route the corresponding response message based on their local routing tables 2516.

It is to be understood that interfaces 2500 and 2510 can be produced using displays such as those shown in FIGS. 26C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

FIG. 26A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as message routing service 902, maintain service layer neighbor component 904, build service layer routing table component 906, route service layer message component 908, CSE 102, AE 106, NSE 108, remote service exposure component 502, service exposure component 506, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510.

As shown in FIG. 26A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 26A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 26B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as message routing service 902, maintain service layer neighbor component 904, build service layer routing table component 906, route service layer message component 908, CSE 102, AE 106, NSE 108, remote service exposure component 502, service exposure component 506, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510. The M2M service layer 22 may be implemented by one or more servers, computers, devices, virtual machines (e.g. cloud/storage farms, etc.) or the like, including for example the devices illustrated in FIGS. 26C and 26D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 26B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as message routing service 902, maintain service layer neighbor component 904, build service layer routing table component 906, route service layer message component 908, CSE 102, AE 106, NSE 108, remote service exposure component 502, service exposure component 506, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510 may be hosted within a M2M service layer instance hosted by an M2M node, such as an M2M server, M2M gateway, or M2M device, as shown in FIG. 26B. For example, the logical entities such as such as message routing service 902, maintain service layer neighbor component 904, build service layer routing table component 906, route service layer message component 908, CSE 102, AE 106, NSE 108, remote service exposure component 502, service exposure component 506, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 26C or FIG. 26D described below.

Further, logical entities such as message routing service 902, maintain service layer neighbor component 904, build service layer routing table component 906, route service layer message component 908, CSE 102, AE 106, NSE 108, remote service exposure component 502, service exposure component 506, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510 can implemented as part of an M2M network that uses a Service Oriented Architecture (SOA) and/or a Resource-Oriented Architecture (ROA) to access services of the present application.

FIG. 26C is a block diagram of an example hardware/software architecture of a M2M network node 30, such as an M2M device 18, an M2M gateway 14, an M2M server, or the like. The node 30 can execute or include logical entities such as message routing service 902, maintain service layer neighbor component 904, build service layer routing table component 906, route service layer message component 908, CSE 102, AE 106, NSE 108, remote service exposure component 502, service exposure component 506, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510. The device 30 can be part of an M2M network as shown in FIG. 26A-B or part of a non-M2M network. As shown in FIG. 26C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 26C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 26C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 26C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 26D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as message routing service 902, maintain service layer neighbor component 904, build service layer routing table component 906, route service layer message component 908, CSE 102, AE 106, NSE 108, remote service exposure component 502, service exposure component 506, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 26A and FIG. 26B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 26 A-B or the device 30 of FIG. 26C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as message routing service 902, maintain service layer neighbor component 904, build service layer routing table component 906, route service layer message component 908, CSE 102, AE 106, NSE 108, remote service exposure component 506, service exposure component 502, phone 702, servers 704 and 706, service layer entities including service layer entities 802, 804, 806, 808, 810, 812, 814, 816, 818, 820, 822, 824 1002, 1004, 1502, 1508, 1510, and CSFs 1404 including message routing CSF 1404, message routing service component 2102, as well as logical entities to create and use service layer messaging resources of FIGS. 16-20 and to produce the user interfaces 2500 and 2510 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer-executable instructions stored in the memory of the apparatus which, when executed by the processor of the apparatus, cause the apparatus to:
    build a first routing table, the first routing table being a network layer routing table;
    build a second routing table, the second routing table being a service layer message routing table, by using a service layer specific capacity to determine at least one service layer measurement metric, the second routing table comprising information pertaining to servers that are service layer neighbors by virtue of one or more of a service layer registration and a service layer policy, the second routing table providing a higher layer routing above the first routing table; and
    route service layer messages from at least one service layer entity to at least one other service layer entity via network routing using the first routing table and service layer routing using the second routing table,
    wherein the service layer specific capacity for the routing of a response to one of the service layer messages is selected using a "resMetric" field in the one of the service layer messages.

2. The apparatus of claim 1, wherein the network layer routing is Internet Protocol (IP) routing.

3. The apparatus of claim 1, wherein the service layer specific capacity concerns service layer sleep mode.

4. The apparatus of claim 1, wherein the service layer specific capacity concerns an ability of a service layer entity to process messages.

5. The apparatus of claim 1, wherein the service layer specific capacity concerns buffering capacity.

6. The apparatus of claim 1, wherein the service layer specific capacity concerns a node capacity indicating whether a service layer entity is resource constrained.

7. The apparatus of claim 1, wherein the apparatus comprises a Common Service Entity (CSE).

8. The apparatus of claim 7, wherein the CSE comprises a message routing Common Service Function (CSF).

9. The apparatus of claim 1, wherein the service layer specific capacity for the routing of one of the service layer messages is selected using a "reqMetric" field in the one of the service layer messages.

10. The apparatus of claim 1, wherein the service layer specific capacity for the routing of a response to one of the service layer messages is selected using a "resMetric" field in the one of the service layer messages.

11. A method performed by an apparatus in communication with a network, comprising:
    building a first routing table, the first routing table being a network layer routing table;
    building a second routing table, the second routing table being a service layer message routing table, by using a service layer specific capacity to determine at least one service layer measurement metric, the second routing table comprising information pertaining to servers that are service layer neighbors by virtue of one or more of a service layer registration and a service layer policy, the second routing table providing a higher layer routing above the first routing table; and
    routing service layer messages from at least one service layer entity to at least one other service layer entity via network routing using the first routing table and service layer routing using the second routing table,
    wherein the service layer specific capacity for the routing of a response to one of the service layer messages is selected using a "resMetric" field in the one of the service layer messages.

12. The method of claim 11, wherein the network layer routing is Internet Protocol (IP) routing.

13. The method of claim 11, wherein the service layer specific capacity concerns service layer sleep mode.

14. The method of claim 11, wherein the service layer specific capacity concerns an ability of a service layer entity to process messages.

15. The method of claim 11, wherein the service layer specific capacity concerns buffering capacity.

16. The method of claim 11, wherein the service layer specific capacity concerns a node capacity indicating whether a service layer entity is resource constrained.

17. The method of claim 11, wherein the apparatus comprises a Common Service Entity (CSE).

18. The method of claim 17, wherein the CSE comprises a message routing Common Service Function (CSF).

* * * * *